US008292722B2

(12) United States Patent
Okada

(10) Patent No.: US 8,292,722 B2
(45) Date of Patent: Oct. 23, 2012

(54) SLOT MACHINE AND CONTROL METHOD OF GAME

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 1141 days.

(21) Appl. No.: 11/875,795

(22) Filed: Oct. 19, 2007

(65) Prior Publication Data

US 2008/0153571 A1 Jun. 26, 2008

Related U.S. Application Data

(63) Continuation-in-part of application No. 10/262,106, filed on Oct. 2, 2002, now abandoned, and a continuation-in-part of application No. 10/263,820, filed on Oct. 4, 2002, now abandoned.

(60) Provisional application No. 60/907,674, filed on Apr. 13, 2007.

(30) Foreign Application Priority Data

Oct. 2, 2001 (JP) ................................ 2001-306773
Oct. 5, 2001 (JP) ................................ 2001-309825

(51) Int. Cl.
*A63F 13/00* (2006.01)
*A63F 13/10* (2006.01)

(52) U.S. Cl. ................ 463/20; 463/16; 463/22; 463/25; 273/138.1; 273/139

(58) Field of Classification Search ............. 463/10–13, 463/16, 20–22, 25, 29, 40–42; 273/138.1, 273/139, 142 B, 142 A, 142 J, 148 A, 149 P, 273/149 R, 243, 292–293, 304, 306, 309; *A63F 13/00, 13/10*

See application file for complete search history.

(56) References Cited

U.S. PATENT DOCUMENTS

| | | | |
|---|---|---|---|
| 4,283,709 | A | 8/1981 | Lucero et al. |
| 4,624,459 | A | 11/1986 | Kaufman |
| 4,669,731 | A | 6/1987 | Clarke |
| 4,837,728 | A | 6/1989 | Barrie et al. |

(Continued)

FOREIGN PATENT DOCUMENTS

| | | |
|---|---|---|
| DE | 3242890 | 5/1984 |

(Continued)

*Primary Examiner* — Arthur O. Hall

(74) *Attorney, Agent, or Firm* — Lexyoume IP Meister, PLLC.

(57) ABSTRACT

A slot machine of the present invention comprises a symbol display device capable of rearranging a plurality of symbols; and a controller, the controller programmed to conduct processing of (A) executing a game in which, after game media in number equal to or less than a predetermined maximum number of BETs are bet, the plurality of symbols are rearranged by the symbol display device, and game media in number according to the arranged symbols or combinations are paid out; (B) shifting a mode from a non-insurance mode to an insurance mode on condition that a predetermined number of game media is inserted; (C) counting the number of games played after shifting to the insurance mode, in the insurance mode; (D) paying out a predetermined number of game media when the number of games counted in the processing (C) reaches a specific number; and (E) clearing the number of games counted in the processing (C) and at the same time shifting the mode from the insurance mode to the non-insurance mode, when a game ending condition which enables a player to figure out that the game has ended is established.

14 Claims, 31 Drawing Sheets

U.S. PATENT DOCUMENTS

| | | | | | |
|---|---|---|---|---|---|
| 4,964,638 | A | | 10/1990 | Ishida | |
| 5,127,651 | A | * | 7/1992 | Okada | 273/143 R |
| 5,178,390 | A | | 1/1993 | Okada | |
| 5,280,909 | A | | 1/1994 | Tracy | |
| 5,344,144 | A | * | 9/1994 | Canon | 463/27 |
| 5,564,700 | A | | 10/1996 | Celona | |
| 5,580,310 | A | * | 12/1996 | Orus et al. | 463/16 |
| 5,611,730 | A | | 3/1997 | Weiss | |
| 5,639,088 | A | | 6/1997 | Schneider et al. | |
| 5,695,402 | A | | 12/1997 | Stupak | |
| 5,702,303 | A | | 12/1997 | Takemoto et al. | |
| 5,770,533 | A | | 6/1998 | Franchi | |
| 5,820,459 | A | | 10/1998 | Acres et al. | |
| 5,823,879 | A | * | 10/1998 | Goldberg et al. | 463/42 |
| 5,836,817 | A | | 11/1998 | Acres et al. | |
| 5,890,963 | A | | 4/1999 | Yen | |
| 5,910,048 | A | | 6/1999 | Feinberg | |
| 6,001,016 | A | | 12/1999 | Walker et al. | |
| 6,003,013 | A | | 12/1999 | Boushy et al. | |
| 6,089,980 | A | | 7/2000 | Gauselmann | |
| 6,113,493 | A | * | 9/2000 | Walker et al. | 463/25 |
| 6,224,482 | B1 | | 5/2001 | Bennett | |
| 6,234,896 | B1 | | 5/2001 | Walker et al. | |
| 6,244,957 | B1 | | 6/2001 | Walker et al. | |
| 6,254,483 | B1 | | 7/2001 | Acres | |
| 6,257,981 | B1 | | 7/2001 | Acres et al. | |
| 6,270,409 | B1 | | 8/2001 | Shuster | |
| 6,273,820 | B1 | | 8/2001 | Haste, III | |
| 6,287,194 | B1 | * | 9/2001 | Okada et al. | 463/16 |
| 6,341,778 | B1 | * | 1/2002 | Lee | 273/292 |
| 6,540,230 | B1 | * | 4/2003 | Walker et al. | 273/292 |
| 6,695,697 | B1 | | 2/2004 | Okada | |
| 6,796,898 | B1 | * | 9/2004 | Timpano | 463/12 |
| 6,932,704 | B2 | | 8/2005 | Walker et al. | |
| 6,932,707 | B2 | | 8/2005 | Duhamel | |
| 2003/0069073 | A1 | | 4/2003 | Okada | |

FOREIGN PATENT DOCUMENTS

| | | | |
|---|---|---|---|
| DE | 3712841 | | 11/1988 |
| DE | 4137010 | | 8/1992 |
| DE | 10049444 | | 11/2001 |
| EP | 0 631 798 | A1 | 1/1995 |
| EP | 0 840 264 | A1 | 5/1998 |
| EP | 1 192 975 | A1 | 4/2002 |
| EP | 1 302 914 | A2 | 4/2003 |
| EP | 1 351 180 | A2 | 10/2003 |
| EP | 1 477 947 | A2 | 11/2004 |
| EP | 1 544 811 | A2 | 6/2005 |
| GB | 2 326 830 | A | 1/1999 |
| JP | 2719450 | | 11/1997 |
| WO | WO03/083795 | A1 | 10/2003 |
| WO | WO2004/095383 | A1 | 11/2004 |

* cited by examiner

Fig. 3

| | PAY TABLE | | | 1BET | 2BET | MAX(3)BET |
|---|---|---|---|---|---|---|
| *1* | *DOUBLE* | *DOUBLE* | *DOUBLE* | *800* | *1600* | *2400* |
| *2* | *DOUBLE* | *DOUBLE* | *3BAR* | *240* | *480* | *720* |
| *3* | *DOUBLE* | *3BAR* | *3BAR* | *120* | *240* | *360* |
| *4* | *3BAR* | *3BAR* | *3BAR* | *60* | *120* | *180* |
| *5* | *DOUBLE* | *DOUBLE* | *2BAR* | *120* | *240* | *360* |
| *6* | *DOUBLE* | *2BAR* | *2BAR* | *60* | *120* | *180* |
| 7 | 2BAR | 2BAR | 2BAR | 30 | 60 | 90 |
| *8* | *DOUBLE* | *DOUBLE* | *1BAR* | *60* | *120* | *180* |
| 9 | DOUBLE | 1BAR | 1BAR | 30 | 60 | 90 |
| 10 | 1BAR | 1BAR | 1BAR | 15 | 30 | 45 |
| 11 | DOUBLE | ANY BAR | ANY BAR | 10 | 20 | 30 |
| 12 | ANY BAR | ANY BAR | ANY BAR | 5 | 10 | 15 |
| *13* | *DOUBLE* | *DOUBLE* | *CHERRY* | *80* | *160* | *240* |
| 14 | DOUBLE | CHERRY | CHERRY | 40 | 80 | 120 |
| 15 | CHERRY | CHERRY | CHERRY | 20 | 40 | 60 |
| 16 | DOUBLE | CHERRY | ANY | 10 | 20 | 30 |
| 17 | CHERRY | CHERRY | ANY | 5 | 10 | 15 |
| 18 | CHERRY | ANY | ANY | 2 | 4 | 6 |
| 19 | GIFT BONUS | | | 44.138 | 44.138 | 44.138 |

Fig. 23

| The number of games | Number of paid out coins |
|---|---|
| 300 | 0 |
| 500 | 50 |
| 800 | 100 |
| 900 | 200 |
| 999 | 300 |

Fig. 29

| Code No. | Index | Number of steps (※) |
|---|---|---|
| 00 | 1 | 0 |
| 01 | | 18 |
| 02 | | 36 |
| 03 | | 54 |
| 04 | | 72 |
| 05 | | 91 |
| 06 | | 109 |
| 07 | | 127 |
| 08 | | 145 |
| 09 | | 163 |
| 10 | | 182 |
| 11 | 2 | 200 |
| 12 | | 218 |
| 13 | | 236 |
| 14 | | 254 |
| 15 | | 273 |
| 16 | | 291 |
| 17 | | 309 |
| 18 | | 327 |
| 19 | | 345 |
| 20 | | 364 |
| 21 | | 382 |

※ The number of steps regarding index 1 as basis of reference

SLOT MACHINE AND CONTROL METHOD OF GAME

CROSS-REFERENCE TO RELATED APPLICATIONS

This application claims benefit of priority based on U.S. Provisional Patent Application No. 60/907,674 filed on Apr. 13, 2007. This application is also a continuation-in-part of U.S. patent application Ser. No. 10/262,106 filed on Oct. 2, 2002, Ser. No. 10/263,820 filed on Oct. 4, 2002. The contents of this these applications are incorporated herein by reference in their entirety.

BACKGROUND OF THE INVENTION

1. Field of the Invention

The present invention relates to as lot machine and a control method of a game.

2. Discussion of the Background

Examples of a conventional slot machine are disclosed in: U.S. Pat. No. 5,820,459, U.S. Pat. No. 6,695,697, US 2003/0069073-A1, EP 1192975-A, U.S. Pat. No. 6,254,483, U.S. Pat. No. 5,611,730, U.S. Pat. No. 5,639,088, U.S. Pat. No. 6,257,981, U.S. Pat. No. 6,234,896, U.S. Pat. No. 6,001,016, U.S. Pat. No. 6,273,820, U.S. Pat. No. 6,224,482, U.S. Pat. No. 4,669,731, U.S. Pat. No. 6,244,957, U.S. Pat. No. 5,910,048, U.S. Pat. No. 5,695,402, U.S. Pat. No. 6,003,013, U.S. Pat. No. 4,283,709, EP0631798-A, DE4137010-A1, GB 2326830-A, DE 3712841-A1, U.S. Pat. No. 4,964,638, U.S. Pat. No. 6,089,980, U.S. Pat. No. 5,280,909, U.S. Pat. No. 5,702,303, U.S. Pat. No. 6,270,409, U.S. Pat. No. 5,770,533, U.S. Pat. No. 5,836,817, U.S. Pat. No. 6,932,704, U.S. Pat. No. 6,932,707, U.S. Pat. No. 4,837,728, EP 1302914-A, U.S. Pat. No. 4,624,459, U.S. Pat. No. 5,564,700, WO 03/083795-A, DE 3242890-A1, EP 0840264-A, DE 10049444-A1, WO 04/095383-A, EP 1544811-A, U.S. Pat. No. 5,890,963, EP 1477947-A, and EP 1351180-A. FIG. 12 is another view showing exemplary images displayed to the slot machine shown in FIG. 1. In a facility where a slot machine or the like is installed, a variety of game media such as coins or cash are inserted into the slot machine to play a game. Each slot machine is configured to according to a winning state (game result) occurring along with development of games.

Among those conventional gaming machines, as disclosed in U.S. Pat. No. 5,910,048 for example, there has been a slot machine in which a profit is returned to the player when loss of the game media reaches a predetermined amount.

It is an object of the present invention to provide a slot machine and a game control method with a new entertainment property, which have a function of returning profits and are capable of preventing players from having an uncomfortable feeling or mistrust and from losing interest in games, thereby offering new entertainments.

The contents of U.S. Pat. No. 5,820,459, U.S. Pat. No. 6,695,697, US 2003/0069073-A1, EP 1192975-A, U.S. Pat. No. 6,254,483, U.S. Pat. No. 5,611,730, U.S. Pat. No. 5,639,088, U.S. Pat. No. 6,257,981, U.S. Pat. No. 6,234,896, U.S. Pat. No. 6,001,016, U.S. Pat. No. 6,273,820, U.S. Pat. No. 6,224,482, U.S. Pat. No. 4,669,731, U.S. Pat. No. 6,244,957, U.S. Pat. No. 5,910,048, U.S. Pat. No. 5,695,402, U.S. Pat. No. 6,003,013, U.S. Pat. No. 4,283,709, EP 0631798-A, DE 4137010-A1, GB 2326830-A, DE 3712841-A1, U.S. Pat. No. 4,964,638, U.S. Pat. No. 6,089,980, U.S. Pat. No. 5,280,909, U.S. Pat. No. 5,702,303, U.S. Pat. No. 6,270,409, U.S. Pat. No. 5,770,533, U.S. Pat. No. 5,836,817, U.S. Pat. No. 6,932,704, U.S. Pat. No. 6,932,707, U.S. Pat. No. 4,837,728, EP 1302914-A, U.S. Pat. No. 4,624,459, U.S. Pat. No. 5,564,700, WO03/083795-A, DE3242890-A1, EP0840264-A, DE 10049444-A1, WO 04/095383-A, EP 1544811-A, U.S. Pat. No. 5,890,963, EP 1477947-A, and EP 1351180-A are incorporated herein by reference in their entirety.

SUMMARY OF THE INVENTION

The present invention provides the following.

(1) A Slot Machine Comprising:

a symbol display device capable of rearranging a plurality of symbols; and a controller.

The controller is programmed to execute the processing of: (A) executing a game in which, after game media in number equal to or less than a predetermined maximum number of BETs are bet, the plurality of symbols are rearranged by the symbol display device, and game media in number according to the arranged symbols or combinations are paid out; (B) shifting a mode from a non-insurance mode to an insurance mode on condition that a predetermined number of game media is inserted; (C) counting the number of games played after shifting to the insurance mode, in the insurance mode; (D) paying out a predetermined number of game media when the number of games counted in the processing (C) reaches a specific number; and (E) clearing the number of games counted in the processing (C) and at the same time shifting the mode from the insurance mode to the non-insurance mode, when a game ending condition which enables a player to figure out that the game has ended is established.

Desirably, the above-mentioned slot machine further comprises the following.

That is, the controller is further programmed to conduct processing of (F) storing game media possessed by the player as credit. Moreover, the processing (E) includes clearing the number of games counted in the processing (C) and shifting the mode from the insurance mode to the non-insurance mode, when the credit runs out.

Desirably, the above-mentioned slot machine further comprises the following.

That is, the controller is further programmed to conduct processing of (G) determining whether or not a player has been changed. Moreover, the processing (E) includes clearing the number of games counted in the processing (C) and at the same time shifting the mode from the insurance mode to the non-insurance mode, when determined that the player has been changed.

Desirably, the above-mentioned slot machine further comprises the following.

That is, the slot machine is further provided with a reader for reading identification data for identifying the player from a card carried by the player. Moreover, the processing (G) is processing for executing processing of: (G-1) reading the identification data from the card through the reader, (G-2) storing the identification data read from the card, and (G-3) determining that the player has been changed, when it is determined that data different from the identification data stored in the processing (G-2) has been read.

Desirably, the above-mentioned slot machine further comprises the following.

That is, the slot machine is further provided with a card slot which allows a card, carried by the player, to be inserted into or removed from the card slot. Moreover, the processing (G) includes clearing the number of games counted in the processing (C) and at the same time shifting the mode from the insurance mode to the non-insurance mode, when it is determined that the card has been inserted into and thereafter removed from the card slot.

Desirably, the above-mentioned slot machine further comprises the following.

That is, the slot machine is further provided with a collect button for inputting a command for returning game media stored as credit. Moreover, the processing (E) includes clearing the number of games counted in the processing (C) and at the same time shifting the mode from the insurance mode to the non-insurance mode, when a signal indicative of a command for returning game media is received from the collect button.

Desirably, the above-mentioned slot machine further comprises the following.

That is, the slot machine is further provided with a ticket printer for outputting a ticket. Moreover, the processing (E) includes clearing the number of games counted in the processing (C) and at the same time shifting the mode from the insurance mode to the non-insurance mode, when it is detected that the ticket printer outputs a ticket on which information about the number of game media stored as credit is recorded.

Desirably, the above-mentioned slot machine further comprises the following.

That is, the controller is further programmed to conduct processing of (H) measuring the time elapsed since the last time a game was executed. Moreover, the processing (E) includes clearing the number of games counted in the processing (C) and at the same time shifting the mode from the insurance mode to the non-insurance mode, when the elapsed time measured in the processing (H) reaches a certain time.

Desirably, the above-mentioned slot machine further comprises the following.

That is, the slot machine is further provided with a BET button which enables the player to input a BET. Moreover, the processing (H) includes measuring the time elapsed since the last time an input from the BET button was detected.

Desirably, the above-mentioned slot machine further comprises the following.

That is, the slot machine is further provided with an input button for inputting a command for shifting the mode from the insurance mode to the non-insurance mode. Moreover, the processing (E) includes clearing the number of games counted in the processing (C) and at the same time shifting the mode from the insurance mode to the non-insurance mode, when a signal indicating the shift to the non-insurance mode, which is output by the operation of the input button is received. Furthermore, the controller is further programmed to conduct processing of (I) paying out game media according to the number of games at the time of receiving a signal indicating the shift to the non-insurance mode, which is output by the operation of the input button.

The present invention provides a game control method comprising the following steps.

That is, the game control method includes the steps of: (A) executing a game in which, after game media in number equal to or less than a predetermined maximum number of BETs are bet, the plurality of symbols are rearranged by the symbol display device capable of rearranging the plurality of symbols, and game media in number according to the arranged symbols or combinations are paid out; (B) shifting a mode from a non-insurance mode to an insurance mode on condition that a predetermined number of game media is inserted; (C) counting the number of games played after shifting to the insurance mode, in the insurance mode; (D) paying out a predetermined number of game media when the number of games counted in the step (C) reaches a specific number; and (E) clearing the number of games counted in the step (C) and at the same time shifting the mode from the insurance mode to the non-insurance mode, when a game ending condition which enables a player to figure out that the game has ended is established.

BRIEF DESCRIPTIONS OF DRAWINGS

FIG. 3 is a view for explaining a payout table in the present embodiment.

FIG. 23 is a view illustrating a number-of-paid-out-coins determination table.

FIG. 29 is a schematic view showing a correspondence table of the number of steps and code No.

DESCRIPTION OF THE EMBODIMENTS

Figure 1:
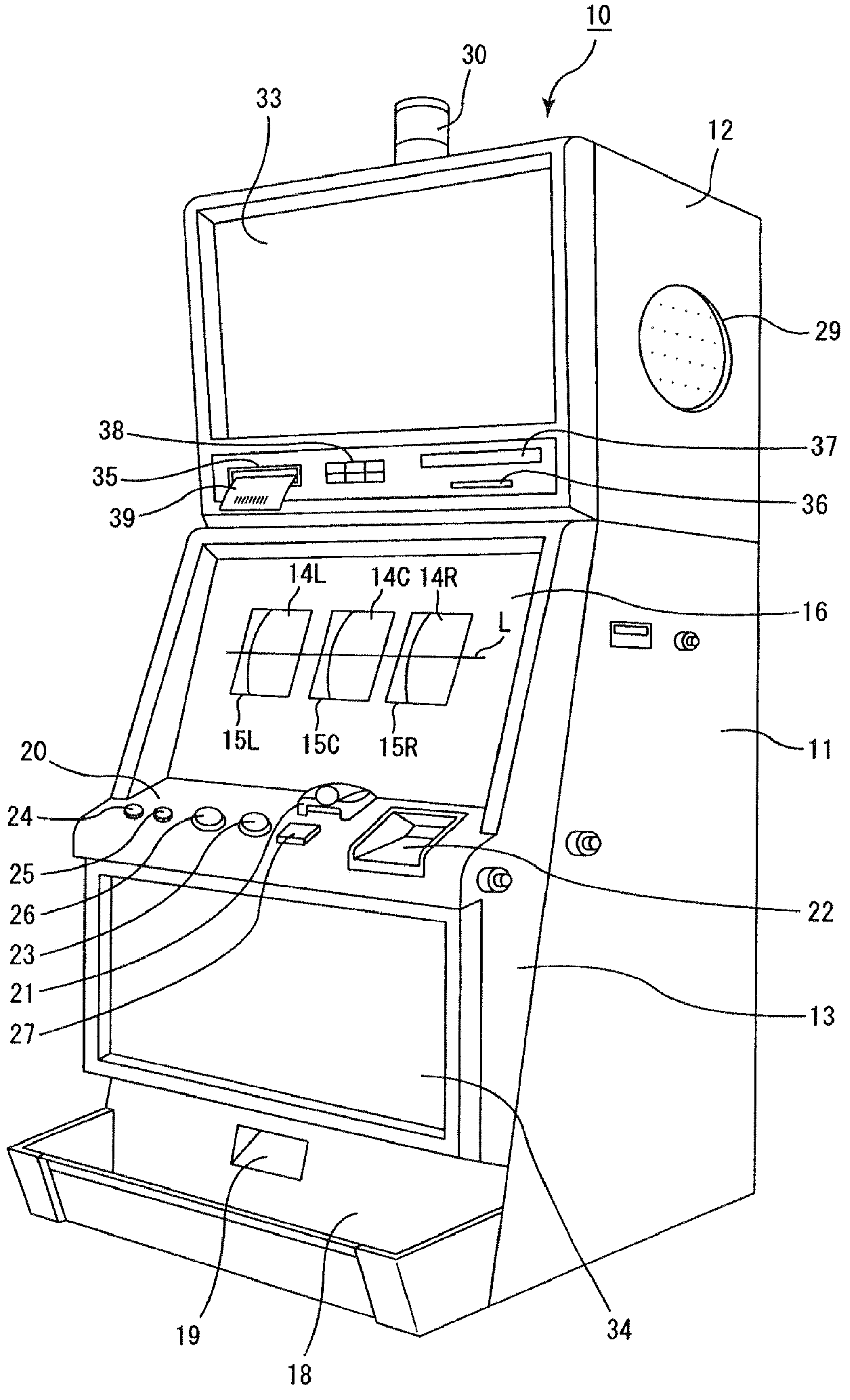
FIG. 1 is a perspective view schematically showing a slot machine according to one embodiment of the present invention.

FIG. 1 is a perspective view schematically showing a slot machine according to one embodiment of the present invention.

In a slot machine 10, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 10 comprises a cabinet 11, a top box 12 installed on the upper side of the cabinet 11, and a main door 13 provided at the front face of the cabinet 11. Inside the cabinet 11, three reels 14 (14L, 14C, 14R) are rotatably provided. On the peripheral face of each of the reels 14, a symbol sequence consisting of 22 figures (hereinafter also referred to as symbols) is drawn.

The reels 14 correspond to the symbol display device of the present invention.

A lower image display panel 16 is provided at the front of the respective reels 14 on the main door 13. The lower image display panel 16 is provided with a transparent liquid crystal panel to which a variety of information concerning a game, an effect image and the like are displayed during the game.

The lower image display panel 16 corresponds to the image display device of the present invention.

On the lower image display panel 16, three display windows 15 (15L, 15C, 15R) are formed in which their back faces are visible, and three symbols drawn on the peripheral face of each of the reels 14 are respectively displayed via each of the display windows 15. On the lower image display panel 16, one winning line L horizontally crossing over the three display windows 15 is formed. The winning line L is for determining a combination of symbols. When the combination of symbols that are rearranged along the winning line L is a predetermined combination, coins are paid out in number according to the combination and the number of inserted coins (the number of BETs).

It is to be noted that, in the present invention, it may be possible to provide a configuration such that, for example, there are formed a plurality of winning lines L crossing horizontally or diagonally over the three display windows 15, and the winning lines L in number according to the number of inserted coins are verified, and when a combination of symbols rearranged along the verified winning line L is a predetermined combination, coins are paid out in number according to the combination.

Further, when a specific symbol (so-called scatter symbol) is rearranged to the display window, coins may be paid out in number according to the number of the scatter symbols regardless of the combination of symbols.

Moreover, although not shown, a touch panel 69 is provided at the front face of the lower image display panel 16. The player can operate the touch panel 69 to input a variety of commands.

Below the lower image display panel 16, there are provided a control panel 20 comprised of a plurality of buttons 23 to 27 with each of which a command according to game progress is inputted by the player, a coin receiving slot 21 through which a coin is accepted into the cabinet 11, and a bill validator 22.

The control panel 20 is provided with a spin button 23, a change button 24, a CASHOUT button 25, a 1-BET button 26 and a maximum BET button 27. The spin button 23 is used for inputting a command to start rotation of the reels 14. The change button 24 is used for making a request of staff in the recreation facility for exchange. The CASHOUT button 25 is used for inputting a command to pay out credited coins to a coin tray 18.

The CASHOUT button 25 corresponds to the collect button and the input button of the present invention.

The 1-BET button 26 is used for inputting a command to bet one coin on a game out of credited coins. The maximum BET button 27 is used for inputting a command to bet the maximum number of coins that can be bet on one game (three coins in the present embodiment) out of credited coins. In addition, the maximum number of BETs may be configured so as to be set by the operator, staff or the like of the casino.

The 1-BET button 26 and the maximum BET button 27 correspond to the BET button of the present invention.

The bill validator 22 not only discriminates a regular bill from a false bill, but also accepts the regular bill into the cabinet 11. It is to be noted that the bill validator 22 may be configured so as to be capable of reading a later-described ticket 39 with a barcode. At the lower front of the main door 13, namely below the control panel 20, there is provided a belly glass 34 on which a character or the like of the slot machine 10 is drawn.

An upper image display panel 33 is provided at the front face of the top box 12. The upper image display panel 33 is provided with a liquid crystal panel to display, for example, an effect image, an image representing introduction of contents of a game, and explanation of a rule of the game.

Also, a speaker 29 is provided on the top box 12. The speaker 29 corresponds to the output device of the present invention. Under the upper image display panel 33, there are provided a ticket printer 35, a card reader 36 (see FIG. 1), a data display 37, and a keypad 38. The ticket printer 35 prints on a ticket a barcode as coded data of the number of credits, a date, an identification number of the slot machine 10, and the like, and outputs the ticket as the ticket 39 with a barcode. The player can make another slot machine read the ticket 39 with a barcode to play a game thereon, or exchange the ticket 39 with a barcode with a bill or the like at a predetermined place in the recreation facility (e.g. a cashier in a casino).

The card reader 36 reads data from a smart card inserted into the card slot 36 and writes data into the smart card. The smart card is a card owned by the player, and for example, data for identifying the player (identification data) and data concerning a history of games played by the player are stored therein. Data corresponding to a coin, a bill or a credit may be stored in the smart card. Further, a magnetic stripe card may be adopted in place of the smart card. The card reader 36 corresponds to the reader of the present invention. The card slot 36*a* corresponds to the card slot of the present invention. The smart card corresponds the card of the present invention. The data display 37 is comprised of a fluorescent display and the like, and displays, for example, data read by the card reader 36 or data inputted by the player via the key pad 38. The key pad 38 is used for inputting a command and data concerning issuing of a ticket, and the like.

Figure 2:
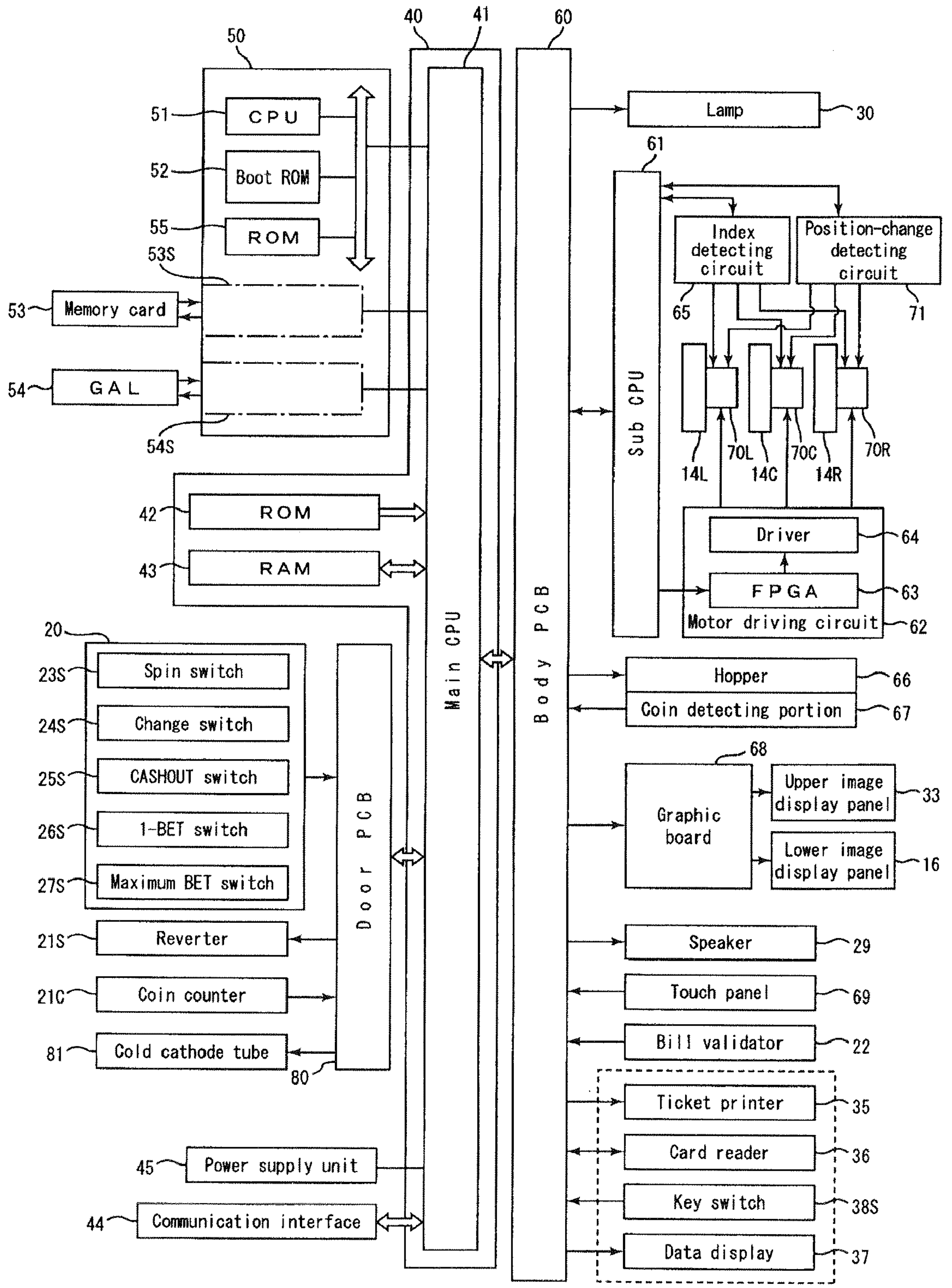
FIG. 2 is a block diagram showing the internal configuration of the slot machine shown in FIG. 1.

FIG. 2 is a block diagram showing the internal configuration of the slot machine shown in FIG. 1.

A gaming board 50 is provided with a CPU (Central Processing Unit) 51, a ROM 55, and a boot ROM 52 which are interconnected to one another by an internal bus, a card slot 53S corresponding to a memory card 53, and an IC socket 54S corresponding to a GAL (Generic Array Logic) 54.

The memory card 53 is comprised of a nonvolatile memory such as CompactFlash (registered trade mark), and stores a game program and a game system program. The game program includes a to-be-stopped symbol determination program. The to-be-stopped symbol determination program is a program for determining a symbol (code No. corresponding to the symbol) on each of the reels 14 to be rearranged along the winning line L. The to-be-stopped symbol determination program includes symbol weighing data respectively corresponding to a plurality of types of payout ratios (e.g. 80%, 84%, 88%). The symbol weighing data is data showing the corresponding relation between code No. of each symbol (see FIG. 29) and one or a plurality of random numbers belonging to a predetermined numerical range (0 to 255), for each of the three reels 14. The payout ratio is set based on payout ratio setting data which is outputted from a GAL 54, and a symbol to be rearranged is determined based on the symbol weighing data corresponding to the payout ratio.

Further, the card slot 53S is configured so as to allow the memory card 53 to be inserted thereinto or removed therefrom, and is connected to the mother board 40 by an IDE bus. Therefore, the memory card 53 can be removed from the card slot 53S, and then another game program and another game system program are written into the memory card 53, and the memory card 53 can be inserted into the card slot 53S, to change the type and contents of a game played on the slot machine 10. Further, the memory card 53 storing one game program and one game system program can be exchanged with the memory card 53 storing another game program and another game system program, to change the type and contents of a game played on the slot machine 10.

The game program includes a program according to development of the game. Further, the game program includes image data and sound data to be outputted during the game, image data and sound data for notifying that the mode has been shifted to the insurance mode, image data and sound data for notifying that the mode has shifted to the non-insurance mode, and the like.

GAL 54 is a type of a PLD having an OR fixed type array structure. The GAL 54 is provided with a plurality of input ports and output ports. When predetermined data is inputted into the input port, the GAL 54 outputs, from the output port, data corresponding to the inputted data. The data outputted from the output port is the above-mentioned payout ratio setting data.

Further, the IC socket 54S is configured such that the GAL 54 can be mounted thereonto and removed therefrom, and the IC socket 54S is connected to the mother board 40 through the PCI bus. Therefore, the GAL 54 can be removed from the IC socket 54S, and then a program to be stored into the GAL 54 is rewritten, and the GAL 54 is then mounted onto the IC socket 54S, to change the payout ratio setting data outputted from the GAL 54. Further, the GAL 54 can be exchanged with another GAL 54 to change the payout ratio setting data.

The CPU 51, the ROM 55 and the boot ROM 52 interconnected to one another by an internal bus are connected to the mother board 40 through the PCI bus. The PCI bus not only conducts signal transmission between the mother board 40 and the gaming board 50, but also supplies power from the mother board 40 to the gaming board 50. In the ROM 55, country identification information and an authentication program are stored. In the boot ROM 52, an auxiliary authentication program and a program (boot code) to be used by the CPU 51 for activating the auxiliary authentication program, and the like are stored.

The authentication program is a program (falsification check program) for authenticating a game program and a game system program. The authentication program is written along a procedure (authentication procedure) for checking and proving that a game program and a game system program to be subject to authentication loading processing have not been falsified, namely authenticating the game program and the game system program. The auxiliary authentication program is a program for authenticating the above-mentioned authentication program. The auxiliary authentication program is written along a procedure (authentication procedure) for proving that an authentication program to be subject to the authentication processing has not been falsified, namely authenticating the authentication program.

The mother board 40 is configured using a commercially available general-purpose mother board (a print wiring board on which fundamental components of a personal computer are mounted), and comprises a main CPU 41, a ROM (Read Only Memory) 42, a RAM (RandomAccessMemory) 43, and a communication interface 44. The main CPU 41, the ROM 42 and the RAM 43 mounted on the mother board 40 constitute the controller of the present invention.

The ROM 42 is comprised of a memory device such as a flash memory, and stores a program such as a BIOS (Basic Input/Output System) executed by the main CPU 41 and permanent data. When the BIOS is executed by the main CPU 41, processing for initializing a predetermined peripheral device is conducted, concurrently with start of processing for loading the game program and the game system stored in the memory card 53 via the gaming board 50. It should be noted that, in the present invention, the ROM 42 may or may not be data rewritable one.

The RAM 43 stores data and a program to be used at the time of operation of the main CPU 41. Further, the RAM 43 is capable of storing an authentication program to be read via the gaming board 50, a game program and a game system program.

Further, the RAM 43 is provided with a storage area for an insurance mode flag. The insurance mode flag is a flag for indicating whether the mode is the insurance mode or the non-insurance mode. The storage area for the insurance mode flag is, for example, composed of a storage area of a predetermined number of bits, and the insurance mode flag is turned "ON" or "OFF" according to the stored contents of the storage area. The insurance mode flag being "ON" indicates the insurance mode, and the insurance mode flag being "OFF" indicates the non-insurance mode.

Further, the RAM 43 is provided with a storage area for data showing the number-of-games C.

Moreover, the RAM 43 stores data of the number of credits, the number of coin-ins and coin-outs in one game, and the like. The communication interface 44 serves to communicate with an external device such as a server of the casino, via the communication line 101.

Moreover, the mother board 40 is connected with a later-described body PCB (Printed Circuit Board) 60 and a door PCB 80 through respective USBs. Further, the mother board 40 is connected with a power supply unit 45. When power is supplied from the power supply unit 45 to the mother board 40, the main CPU 41 of the mother board 40 is activated concurrently with supply of power to the gaming board 50 via the PCI bus to activate the CPU 51.

The body PCB 60 and the door PCB 80 are connected with an equipment and a device that generate an input signal to be inputted into the main CPU 41 and an equipment and a device operations of which are controlled by a control signal outputted from the main CPU 41. The main CPU 41 executes the game program and the game system program stored in the RAM 43 based on the input signal inputted into the main CPU 41, and thereby executes the predetermined arithmetic processing, stores the result thereof into the RAM 43, or transmits a control signal to each equipment and device as processing for controlling each equipment and device.

The body PCB 60 is connected with a lamp 30, a sub CPU 61, a hopper 66, a coin detecting portion 67, a graphic board 68, a speaker 29, a touch panel 69, a bill validator 22, a ticket printer 35, a card reader 36, a key switch 38S and a data display 37. The lamp 30 is lighted in a predetermined pattern based on a control signal outputted from the main CPU 41. In more specific, the lamp 30 blinks during a display of a countdown, which will be described be low by using FIGS. 4 to 13, and increases the blinking frequency as the countdown approaches zero. Here, it is also possible that the lamp 30 comprises a revolving light, and the blinking frequency is increased as the countdown approaches zero.

The sub CPU 61 serves to control rotation and stop of the reels 14 (14L, 14C, 14R). A motor driving circuit 62 having an FPGA (Field Programmable Gate Array) 63 and a driver 64 are connected to the sub CPU 61. The FPGA 63 is an electronic circuit such as a programmable LSI, and functions as a control circuit of a stepping motor 70. The driver 64 functions as an amplification circuit of a pulse to be inputted into the stepping motors 70. The stepping motors 70 (70L, 70C, 70R) for rotating the respective reels 14 are connected to the motor driving circuit 62. The stepping motor 70 is a one-two phase excitation stepping motor.

In the present invention, the excitation method of the stepping motor is not particularly limited, and for example, a two phase excitation method, one phase excitation method or the like may be adopted. Further, a DC motor may be adopted in place of the stepping motor. In the case of adopting the DC motor, a deviation counter, a D/A converter, and a servo amplifier are sequentially connected to the sub CPU 61, and the DC motor is connected to the servo amplifier. Further, a rotational position of the DC motor is detected by a rotary encoder, and a current rotational position of the DC motor is supplied as data from the rotary encoder to the deviation counter.

Further, an index detecting circuit 65 and a position-change detecting circuit 71 are connected to the sub CPU 61. The index detecting circuit 65 detects the position (later-described index) of the reels 14 during rotation, and is further capable of detecting a loss of synchronism of the reels 14. It should be noted that the control of rotation and stoppage of reels 14 will be described later in detail using the figures.

The position-change detecting circuit 71 detects the change of the stop positions of the reel 14, after the stop of the rotation of the reels 14. For example, the position-change detecting circuit 71 detects the change of the stop positions of the reels 14, in a case such that a player forcibly changes the stop positions of reels 14 to create a combination of symbols in a winning state, even though the actual combination of symbols is not in the winning state, or in some other cases. The position-change detecting circuit 71 is configured, for example, to detect fins (not shown) mounted to the inner sides of the reels 14 at predetermined intervals so as to detect the change of the stop positions of the reels 14.

The hopper 66 is installed inside the cabinet 11, and pays out a predetermined number of coins based on the control signal outputted from the main CPU 41, from the coin payout exit 19 to the coin tray 18. The coin detecting portion 67 is provided inside the coin payout exit 19, and outputs an input signal to the main CPU 41 in the case of detecting payout of the predetermined number of coins from the coin payout exit 19.

The graphic board 68 controls image display to the upper image display panel 33 and the lower image display panel 16 based on the control signal outputted from the main CPU 41. The number of credits stored in the RAM 43 is displayed to the number-of-credits display portion 31 of the lower image display panel 16. Further, the number of payouts of coins is displayed to the number-of-payouts display portion 32 of the lower image display panel 16.

The graphic board 68 comprises a VDP (Video Display Processor) for generating image data based on the control signal outputted from the main CPU 41, a video RAM for temporarily storing image data generated by the VDP, and the like. It is to be noted that image data used in generation of the image data by the VDP is included in the game program read from the memory card 53 and stored into the RAM 43.

The bill validator 22 not only discriminates a regular bill from a false bill, but also accepts the regular bill into the cabinet 11. Upon acceptance of the regular bill, the bill validator 22 outputs an input signal to the main CPU 41 based on a face amount of the bill. The main CPU 41 stores in the RAM 43 the number of credits corresponding to the face amount of the bill transmitted with the input signal.

The ticket printer 35, based on the control signal outputted from the main CPU 41, prints on a ticket a barcode formed by encoding data such as the number of credits stored in the RAM 43, a date, and an identification number of the slot machine 10, and outputs the ticket as the ticket 39 with a barcode. The ticket printer 35 corresponds to the ticket printer of the present invention. The card reader 36 reads data from the smart card and transmits the read data to the main CPU 41, and writes data onto the smart card based on the control signal from the main CPU 41. The key switch 38S is provided on the key pad 38, and outputs a predetermined input signal to the main CPU 41 when the key pad 38 is operated by the player. The data display 37 displays data read by the card reader 36 and data inputted by the player via the key pad 38 based on the control signal outputted from the main CPU 41.

The door PCB 80 is connected with a control panel 20, a reverter 21S, a coin counter 21C, and a cold cathode tube 81. The control panel 20 is provided with a spin switch 23S corresponding to the spin button 23, a change switch 24S corresponding to the change button 24, a CASHOUT switch 25S corresponding to the CASHOUT button 25, a 1-BET switch 26S corresponding to the 1-BET button 26, and the maximum BET switch 27S corresponding to the maximum BET button 27. The respective switches 23S to 27S output input signals to the main CPU 41 when each of the buttons 23 to 27 corresponding thereto is operated by the player.

The coin counter 21C is provided inside the coin receiving slot 21, and discriminates a regular coin from a false coin inserted into the coin receiving slot 21 by the player. Coins other than the regular coin are discharged from the coin payout exit 19. Further, the coin counter 21C outputs an input signal to the main CPU 41 in detection of the regular coin.

The reverter 21S operates based on the control signal outputted from the main CPU 41, and distributes a coin recognized by the coin counter 21C as the regular coin into a cash box (not shown) or the hopper 66, which are disposed in the slot machine 10. Namely, when the hopper 66 is filled with coins, the regular coin is distributed into the cash box by the reverter 21S. On the other hand, when the hopper 66 is not filled with coins, the regular coin is distributed into the hopper 66. The cold cathode tube 81 functions as a back light installed on the rear face side of the lower image display panel 16 and the upper image display panel 33, and is lit up based on the control signal outputted from the main CPU 41.

FIG. 3 is a view for explaining a payout table in the present embodiment.

"DOUBLE", "3BAR", "2BAR", "1BAR", and "CHERRY" in the payout table represent types of symbols drawn on the reels 14. It is to be noted that, other than the above-mentioned symbols, a bonus trigger, which is a symbol corresponding to "GIFT BONUS", and other symbols are also drawn on the reels 14. In the payout table, "ANY BAR" represents the "3BAR", "2BAR" or "1BAR", and "ANY" represents an arbitrary symbol.

Combinations shown in the payout table represent winning combinations, and the number of coin-outs is set for each of the winning combinations, according to the numbers of BETs.

When a combination of symbols on each of the reels 14 which are rearranged is the combination of "GIFT BONUS" bonus triggers, a predetermined number of coins is paid out as a jackpot. It is to be noted that a numeric value corresponding to "GIFT BONUS" in the payout table indicates an expectation value of the number of coin-outs, and is constant regardless of the number of BETs. Therefore, a setting is made such that the probability for establishing "GIFT BONUS" is high and the number of coin-outs is small in the case of 1BET whereas the probability for establishing "GIFT BONUS" is low and the number of coin-outs is large in the case of the MAXBET. It should be noted that this probability setting is made by using symbol weighing data.

Further, four types of jackpots "GRAND", "NMAJOR", "MINOR" and "MINI" are provided in decreasing order of the number of coin-outs. The larger the number of coin-outs, the lower the jackpot occurrence ratio is set, and which jackpot is to be established is determined randomly using a random number. It should be noted that the expectation value of the number of coin-outs according to each jackpot is constant.

Here, each of the jackpots is set to payout 180 or more coins.

When a game is started by pressing of the spin button 23 after pressing of a 1-BET button 26 or a maximum BET button 27, the sequence of symbols drawn on each of the reels 14 is scroll-displayed downwardly in the display windows 15 with rotation of the reels 14, and after the lapse of a predetermined period of time, the sequence of symbols drawn on each of the reels 14 is rearranged in the display windows 15 with the stop of rotation of the reels 14. Further, a variety of winning combinations are previously set based on the respective combinations of symbols, and when the combination of symbols corresponding to the winning combination stops along the winning line L, the number of coin-outs according to the winning combination is added to credits owned by the player. When the combination of "GIFT BONUS" bonus triggers is established, a predetermined number of coin-outs is added to the credits owned by the player.

It should be noted that, in the present embodiment, there is described the case of paying out coins according to the jackpot when the combination of bonus triggers is established. However, the gaming state generated in establishment of the combination of bonus triggers is not particularly limited in the present invention. Examples of the gaming state may include a free game, a second game, and a mystery bonus. Further, when the combination of bonus triggers is established, the ticket 39 with a barcode may be issued with predetermined information printed thereon.

Combinations of symbols in italic in the payout table are combinations of which the number of coin-outs to be conducted is equal to or more than 180 when established in a game played with a MAXBET.

In the game played with a MAXBET in the insurance mode, when any one of those combinations of symbols is established, the mode is shifted from the insurance mode to the non-insurance mode.

Here, insurance in the slot machine 10 is described.

As for the insurance, the slot machine 10 has two modes: the insurance mode "RESCUE PAY ON"; and the non-insurance mode "RESCUE PAY OFF".

The non-insurance mode is set immediately after the power is turned on in the slot machine 10, and the mode is then shifted to the insurance mode by inserting a predetermined number of game media.

In the insurance mode, the number of games played after shifting to the insurance mode is counted.

When the number of games counted in the insurance mode reaches 1000, 360 coins are paid out (RESCUE PAY).

However, in the game played with a MAXBET in the insurance mode, when there is established a combination of which the number of coin-outs is equal to or more than 180, the number of games counted is cleared and the mode is shifted from the insurance mode to the non-insurance mode, as described above.

Next, the flow [P01] to [P20] of a game played on the slot machine 10 is described by using FIGS. 4 to 13.

FIGS. 4 to 13 are views showing images displayed to the upper image display panel 33 and the lower image display panel 16 provided in the slot machine 10.

In the figures, a numeral 15 (15L, 15C, 15R) denotes a display window. A numeral 31 denotes a number-of-credits display portion. A numeral 32 denotes a number-of-payouts display portion. A symbol L denotes a winning line.

[P01]

Figure 4:
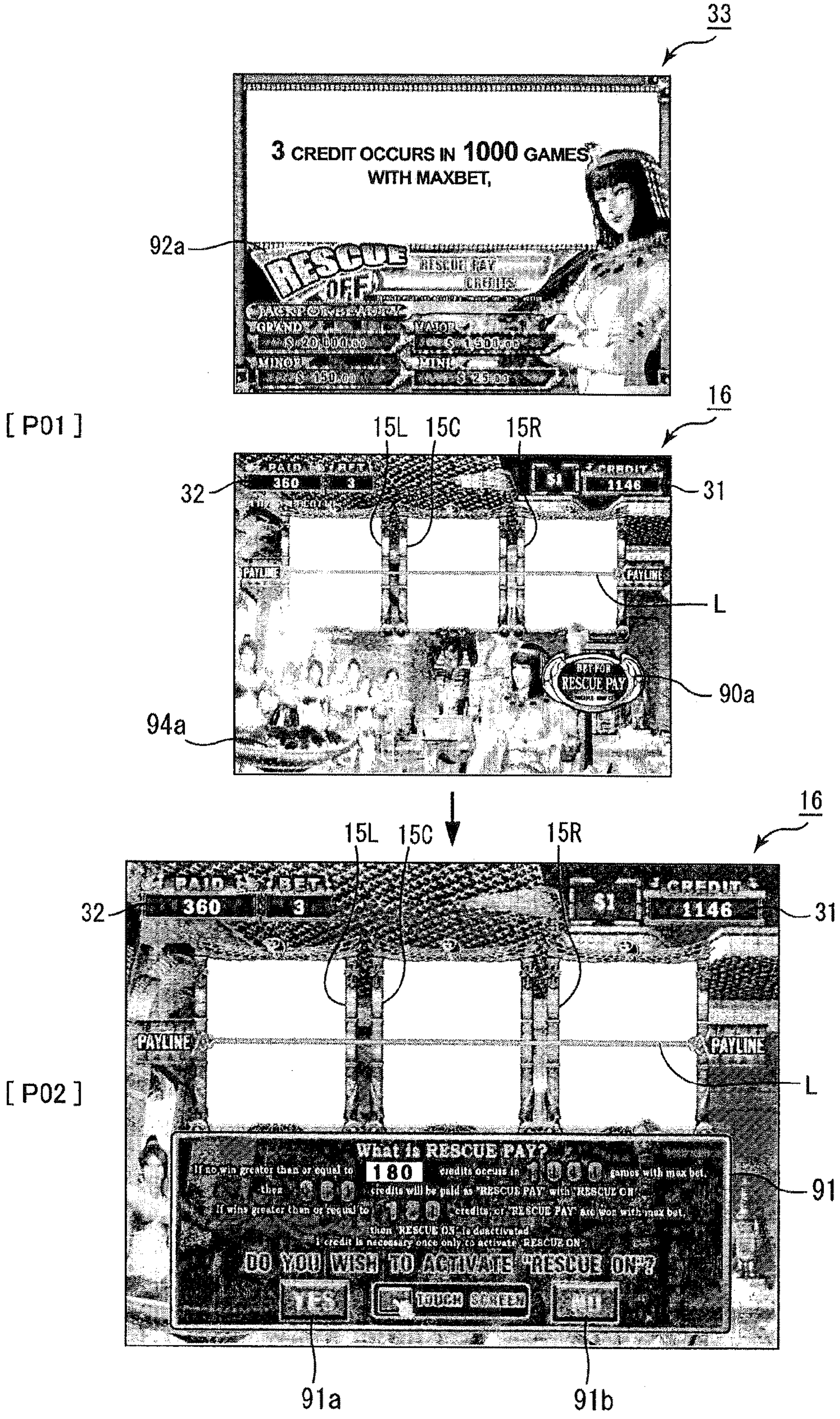
FIG. 4 is a view showing exemplary images displayed to the slot machine shown in FIG. 1.

In the non-insurance mode, as shown in FIG. 4, an image 92*a* showing "RESCUE OFF" is displayed to the upper image display panel 33. The image 92*a* is an image showing that the current gaming state is the non-insurance mode.

Further, a normal effect image 94*a* is displayed to the lower image display panel 16.

Moreover, a button type image 90*a* showing "BET FOR RESCUE PAY MORE INFO" is displayed to the lower right portion of the lower image display panel 16. The image 90*a* is an image to request an input of a command to output information concerning the insurance mode. The player can input the command to output information concerning the insurance mode by touching a predetermined place of the touch panel 69 corresponding to the display area of the button type image 90*a*.

[P02]

When the above-mentioned command is inputted, an image 91 showing information concerning the insurance mode is displayed to the lower image display panel 16.

The image 91 includes information concerning the insurance mode as follows:

(I) the number of games to reach for paying out a predetermined number of coins, namely, a specific number (1000);

(II) the number (360) of coin-outs when the number of games reaches the specific number;

(III) clearing the number of games when a game with the MAXBET placed thereon and the number of coin-outs being equal to or more than 180 is played before the number of games reaches the specific number, namely, a number-of-games clearing condition;

(IV) shifting the mode from the insurance mode to the non-insurance mode when the game with the MAXBET placed thereon and the number of coin-outs being equal to or more than 180 is played before the number of games reaches the specific number, namely, an insurance canceling condition;

(V) counting the number of games with the MAXBET placed thereon, namely games to be counted; and (VI) the number (1) of credits necessary for shifting the mode from the non-insurance mode to the insurance mode.

Further, the image 91 includes information to make a request for an option as to whether or not to shift the mode from the non-insurance mode to the insurance mode, a button type image "YES" 91*a*, and a button type image "NO" 91*b*.

When a predetermined area of the touch panel 69 corresponding to the button type image "NO" 91*b* is touched by the player, an image shown in [P01] is displayed to the lower image display panel 16. On the other hand, when a predetermined area of the touch panel 69 corresponding to the button type image "YES" 91*a* is touched by the player, the mode is shifted from the non-insurance mode to the insurance mode.

[P03]

Figure 5:
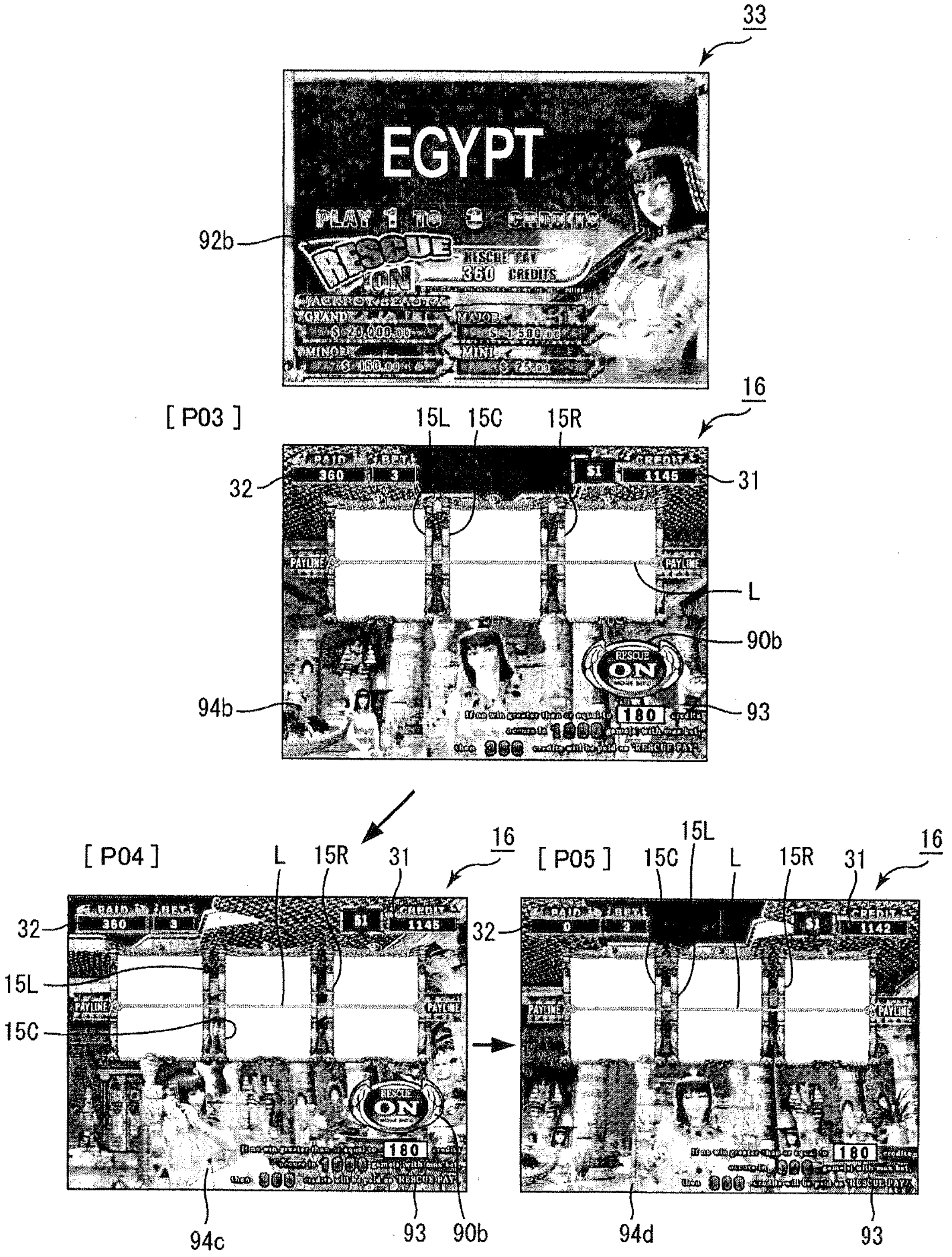
FIG. 5 is another view showing exemplary images displayed to the slot machine shown in FIG. 1.

When the mode is shifted to the insurance mode, as shown in FIG. 5, an image 92*b* showing "RESCUE ON" is displayed to the upper image display panel 33. The image 92*b* is an image showing that the current gaming state is the insurance mode.

Further, a normal effect image 94*b* is displayed to the lower image display panel 16. While the normal effect image 94*b* in the insurance mode differs from a normal effect image 94*a* in the non-insurance mode, these are selected randomly by using random numbers, not based on whether the mode is the insurance mode or the non-insurance mode.

Further, a button type image 90*b* showing "RESCUE ON MORE INFORMATION" is displayed to the lower right portion of the lower image display panel 16. The button type image 90*b* is an image for showing that the current gaming state is the insurance mode and also for inputting a command to output information concerning the insurance mode.

When a predetermined place of the touch panel 69 corresponding to the display area of the button type image 90*b* is touched by the player, an image shown in [P02] is displayed to the lower image display panel 16.

Further, an image 93 is displayed below the button type image 90*b*, which shows that 360 coins are to be paid out when the number of games with the MAXBET (games to be counted) reaches a specific number.

[P04]

When the game is started in the insurance mode, in a first game in the insurance mode, a normal effect image 94*c* is displayed to the lower image display panel 16, and the button type image 90*b* and the image 93 are continuously displayed. The image 93 shows that 360 coins are to be paid out when the games to be counted are played 1000 times from now on.

[P05]

In a second game in the insurance mode, a normal effect image 94*d* is displayed and the image 93 is continuously displayed. The image 93 shows that 360 coins are to be paid out when the games to be counted are played 999 times from now on.

As thus described, in the slot machine 10, the image 93 is displayed to the lower image display panel 16, the image 93 showing the number of games to be played from the time point of starting the game in the insurance mode until the number of games to be counted reaches a specific number. Subsequently, the number of games left to be played is counted down on the image 93 so long as the above-mentioned number-of-games clearing condition or insurance canceling condition is not established. It is to be noted that as thus described, the normal effect image 94 is displayed in the insurance mode until the number of games reaches 990 (notice set value).

[P06]

Figure 6:
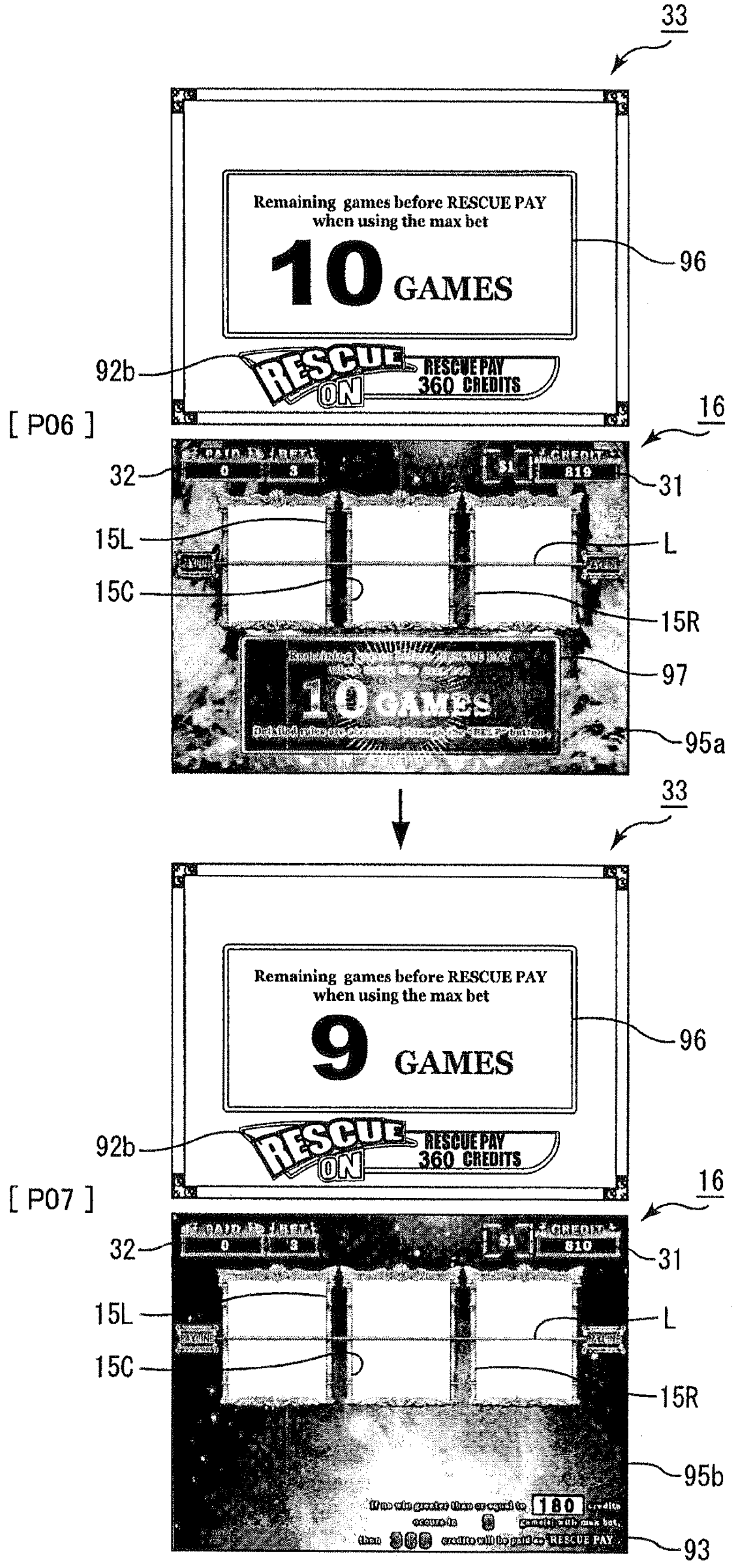
FIG. 6 is another view showing exemplary images displayed to the slot machine shown in FIG. 1.

When the number of games in the insurance mode reaches 990 (notice set value), as shown in FIG. 6, to the upper image display panel 33, the image 92*b* is displayed which shows that the current gaming state is the insurance mode and an image 96 is displayed which shows that the number of games left to be played until the number of games to be counted reaches the specific number is ten.

Further, also to the lower image display panel 16, an image 97 is displayed which shows that the number of games left to be played until the number of games to be counted reaches the specific number is ten.

Moreover, a specific effect image 95*a* is displayed to the lower image display panel 16. The specific effect image 95 is displayed after the number of games to be counted has reached the notice set value, in the insurance mode.

[P07]

When the number of games played in the insurance mode becomes 991, the number of games left to be played which is shown by the image 96 displayed to the upper image display panel 33 changes from ten to nine.

Further, also to the lower image display panel 16, the image 93 is displayed which shows that the number of games left to be played until the number of games to be counted reaches the specific number is nine.

Moreover, a specific effect image 95*b* is displayed to the lower image display panel 16.

The specific effect image 95*b* is a video picture with its contents continued from the specific effect image 95*a* in [P06].

[P08] to [P15]

Subsequently, as the number of games in the insurance mode increases, the number of games left to be played shown by the image 96 displayed to the upper image display panel 33 gradually decreases as shown in FIGS. 7 to 10. Further, in the lower image display panel 16, the number of remaining games shown by image 93 is gradually decreased. Moreover, to the lower image display panel 16, specific effect images 95*c* to 95*j* are sequentially displayed according to the number of games left to be played.

The specific effect image 95 is a video picture where a character (angel) performs a series of actions (action of appearing and spreading her wings), and specific effect images 95*a* to 95*j* are made by dividing the specific effect image 95 into a plurality of images along the time axis.

[P16]

When the number of games in the insurance mode reaches the specific number, 360 coins (credits) are paid out.

Figure 11:
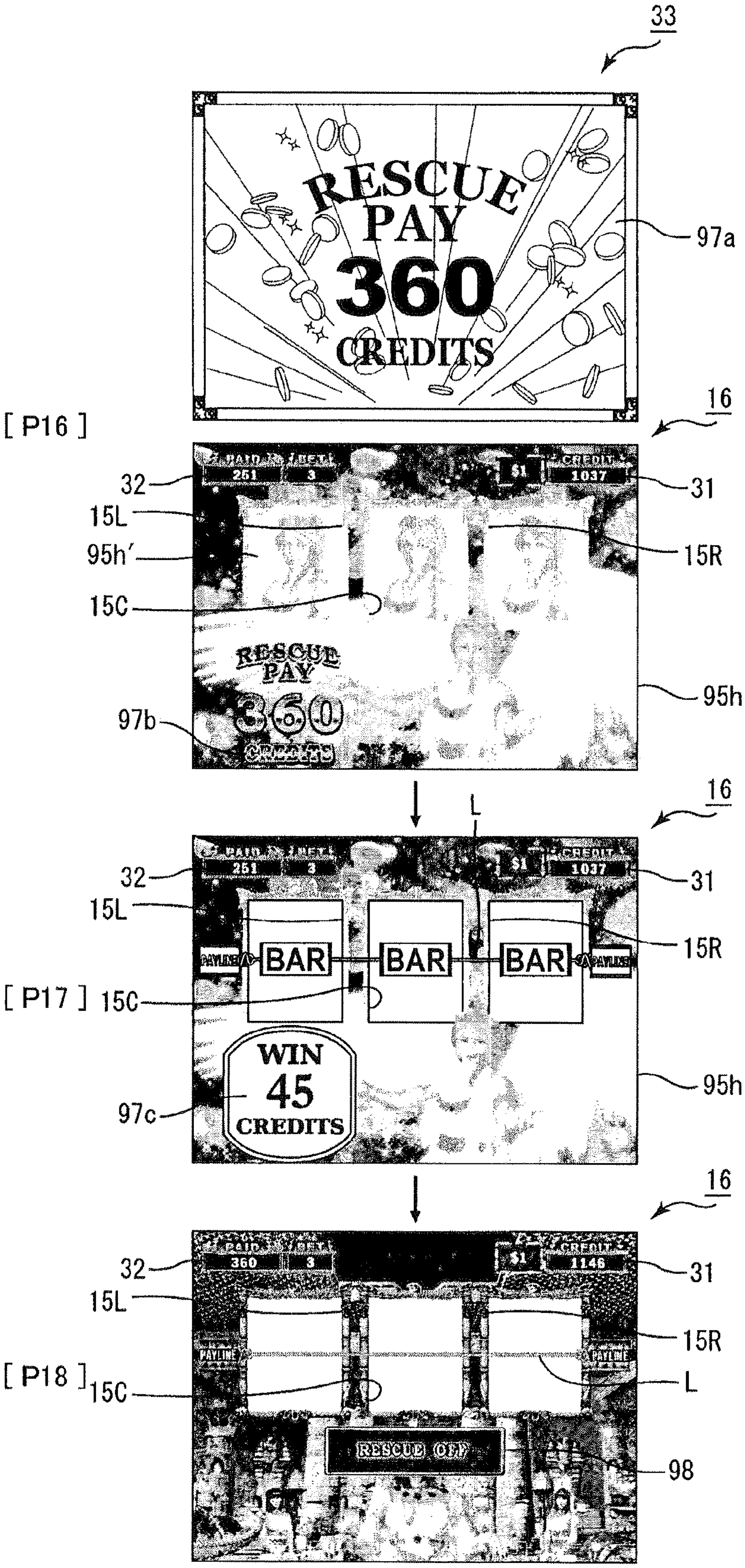
FIG. 11 is another view showing exemplary images displayed to the slot machine shown in FIG. 1.

At this time, as shown in FIG. 11, an image 97*a* is displayed to the upper image display panel 33, the image 97*a* showing that coins are being paid out based on that the number of games in the insurance mode has reached the specific number. Further, a similar image 97*b* is also displayed to the lower left side of the lower image display panel 16.

Moreover, to the lower image display panel 16, a specific effect image 95*h* with its contents continued from the specific effect images 95*a* to 95*j*. Furthermore, a specific effect image 95*h'* is displayed in the display windows 15 (15L, 15C, 15R).

[P17]

It should be noted that, when a predetermined winning combination is established in a game with which the number of games in the insurance mode has reached the specific number, coins are paid out based on that the number of games has reached the specific number, and thereafter, coins are paid out based on the above-mentioned winning combination.

At this time, while the specific effect image 95*h* is continuously displayed to the lower image display panel 16, the specific effect image 95*h*' in the display windows 15 disappears so that the reels 14 becomes visible.

Further, an image 97*c* is displayed to the lower left side of the lower image display panel 16, the image 97*c* showing that coins are being paid out according to the above-mentioned winning combination.

[P18]

At the end of the game with which the number of games in the insurance mode has reached the specific number, the number of games is cleared, and the mode is shifted from the insurance mode to the non-insurance mode.

At this time, an image 98 showing "RESCUE OFF" is displayed to the lower image display panel 16. The image 98 is an image showing that the mode has been shifted from the insurance mode to the non-insurance mode.

[P19]

Figure 12:
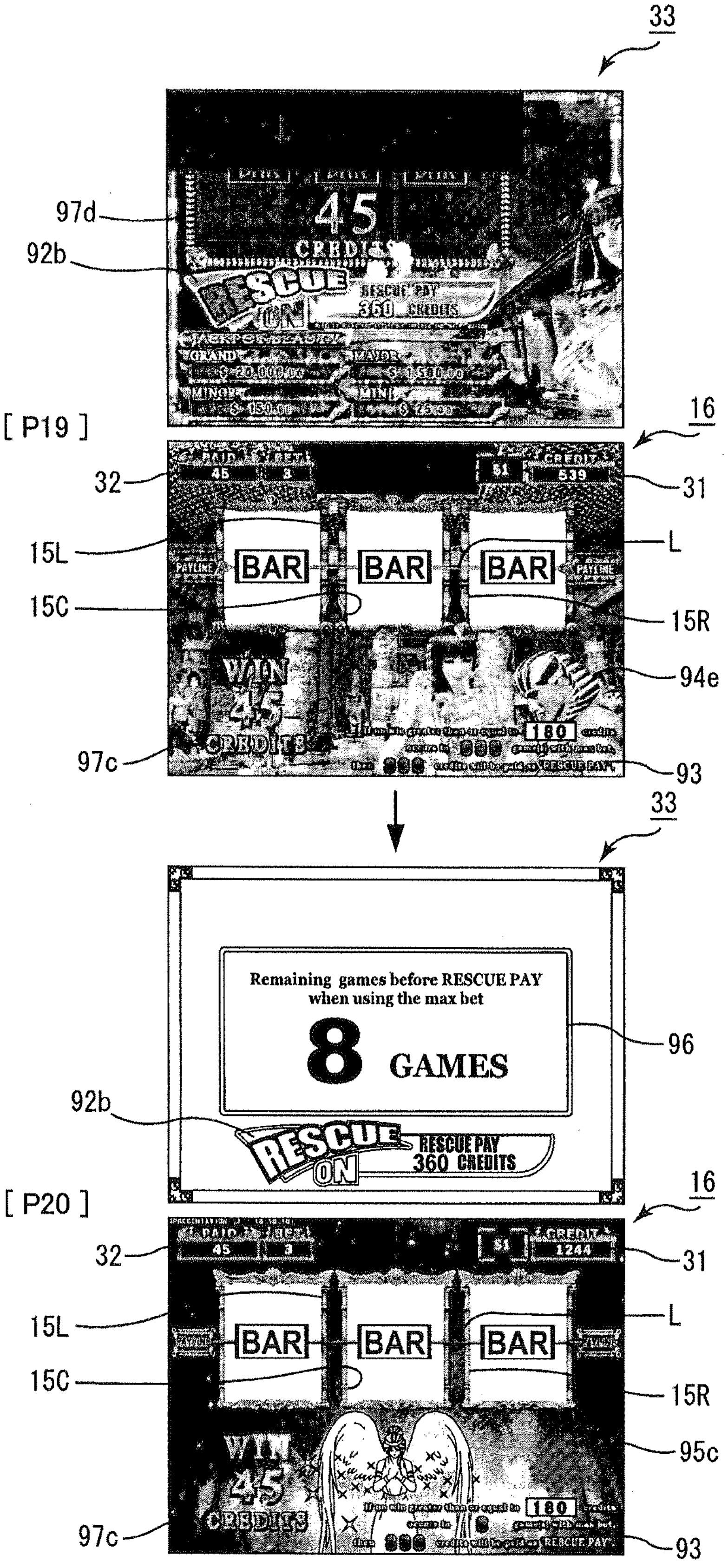
FIG. 12 is another view showing exemplary images displayed to the slot machine shown in FIG. 1.

In a case where the number of games has not reached 990 (notice set value) in the insurance mode, when the combination of symbols "BAR"-"BAR"-"BAR" accompanied by coin-outs is established, an image 97*d* showing "45 CREDITS" is displayed to the upper image display panel 33 as shown in FIG. 12.

The image 97*d* is an image showing the number of coins to be paid out according to the combination of symbols "BAR"-"BAR"-"BAR".

Further, the image 92*b* showing "RESCUE ON" is displayed to the upper image display panel 33. The image 92*b* is an image showing that the current gaming state is the insurance mode.

An effect image 94*e* corresponding to "BAR"-"BAR"-"BAR" is displayed to the lower image display panel 16.

Moreover, to the lower image display panel 16, the image 93 is displayed which shows the number of games left to be played until the number of games to be counted reaches the specific number, and the image 97*c* is displayed which shows the number of coin-outs according to the combination of symbols "BAR"-"BAR"-"BAR".

[P20]

After the number of games has reached 990 (notice set value), when the combination of symbols "BAR"-"BAR"-"BAR" accompanied by coin-outs is established in the insurance mode as in [P19], the image 97*c* is displayed to the lower image display panel 16, the image 97*c* showing the number of coin-outs according to the combination of symbols "BAR"-"BAR"-"BAR".

Figure 7:
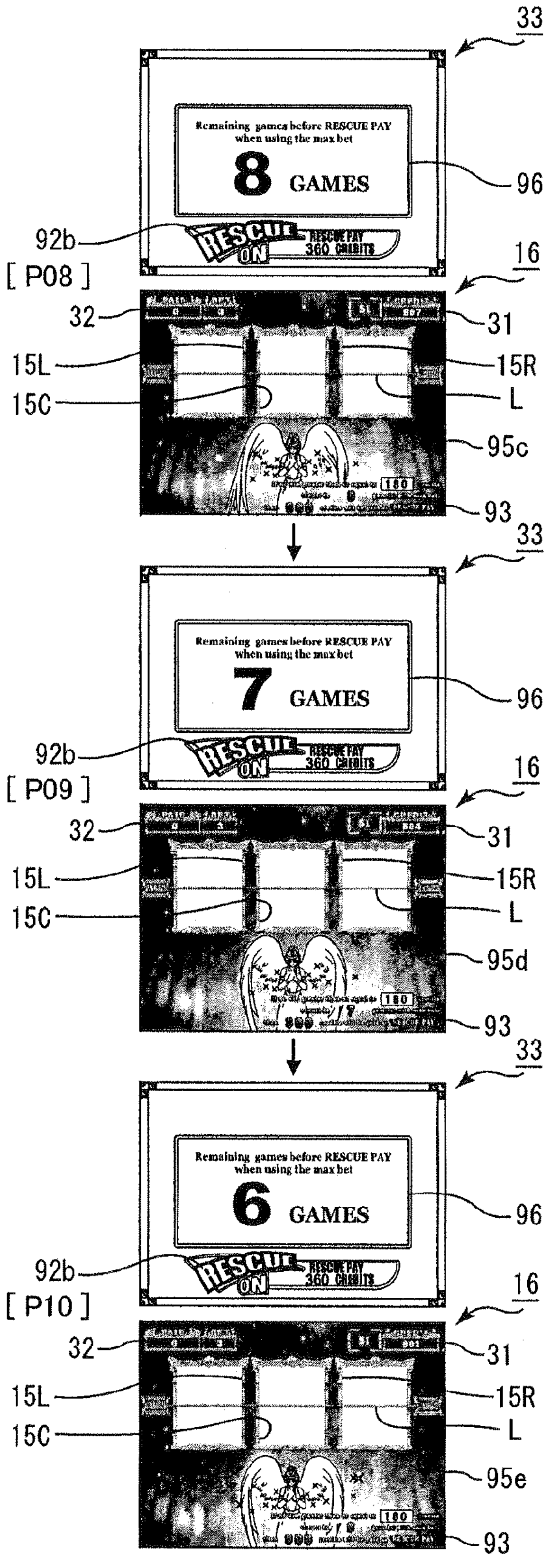
FIG. 7 is another view showing exemplary images displayed to the slot machine shown in FIG. 1.
Figure 8:
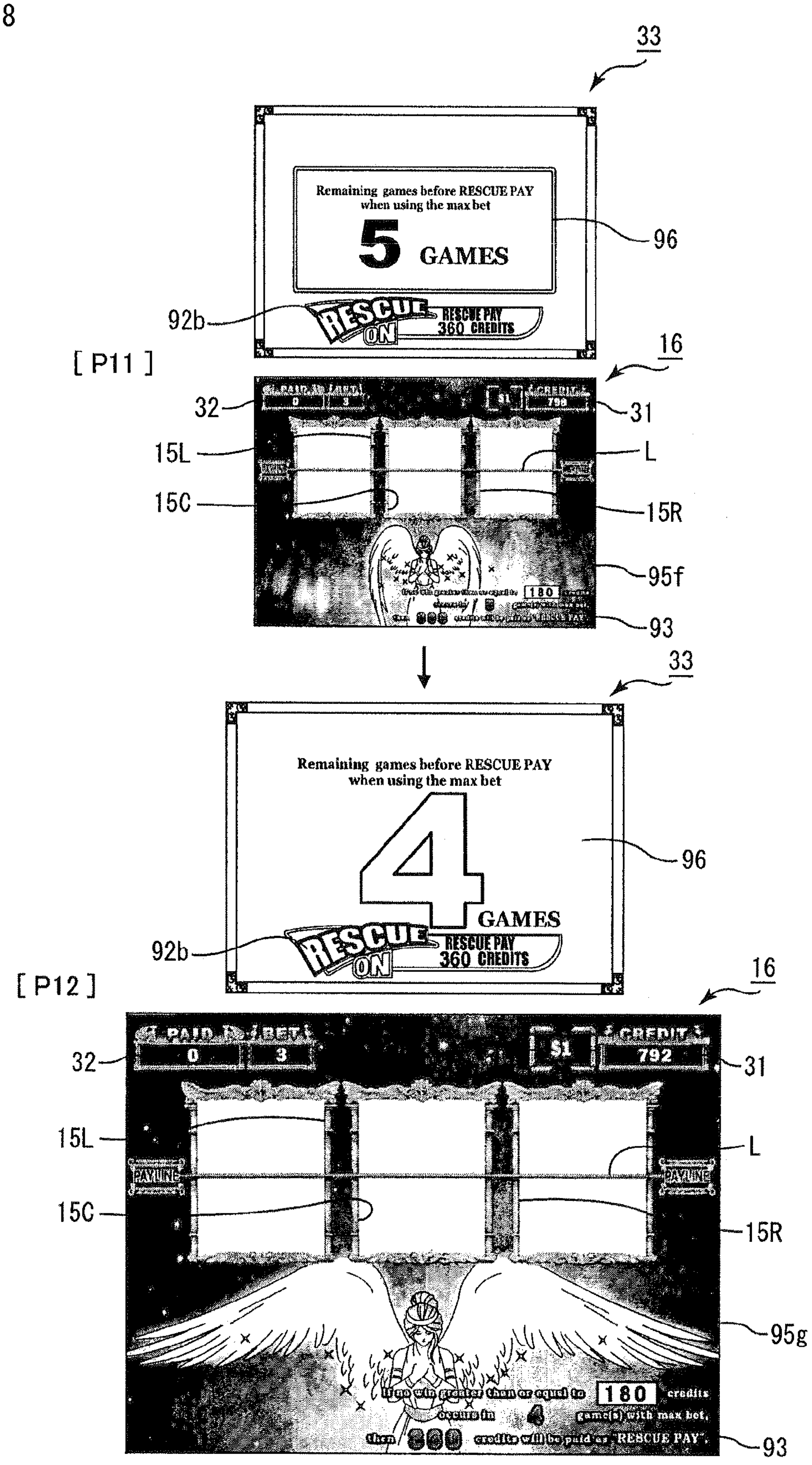
FIG. 8 is another view showing exemplary images displayed to the slot machine shown in FIG. 1.
Figure 9:
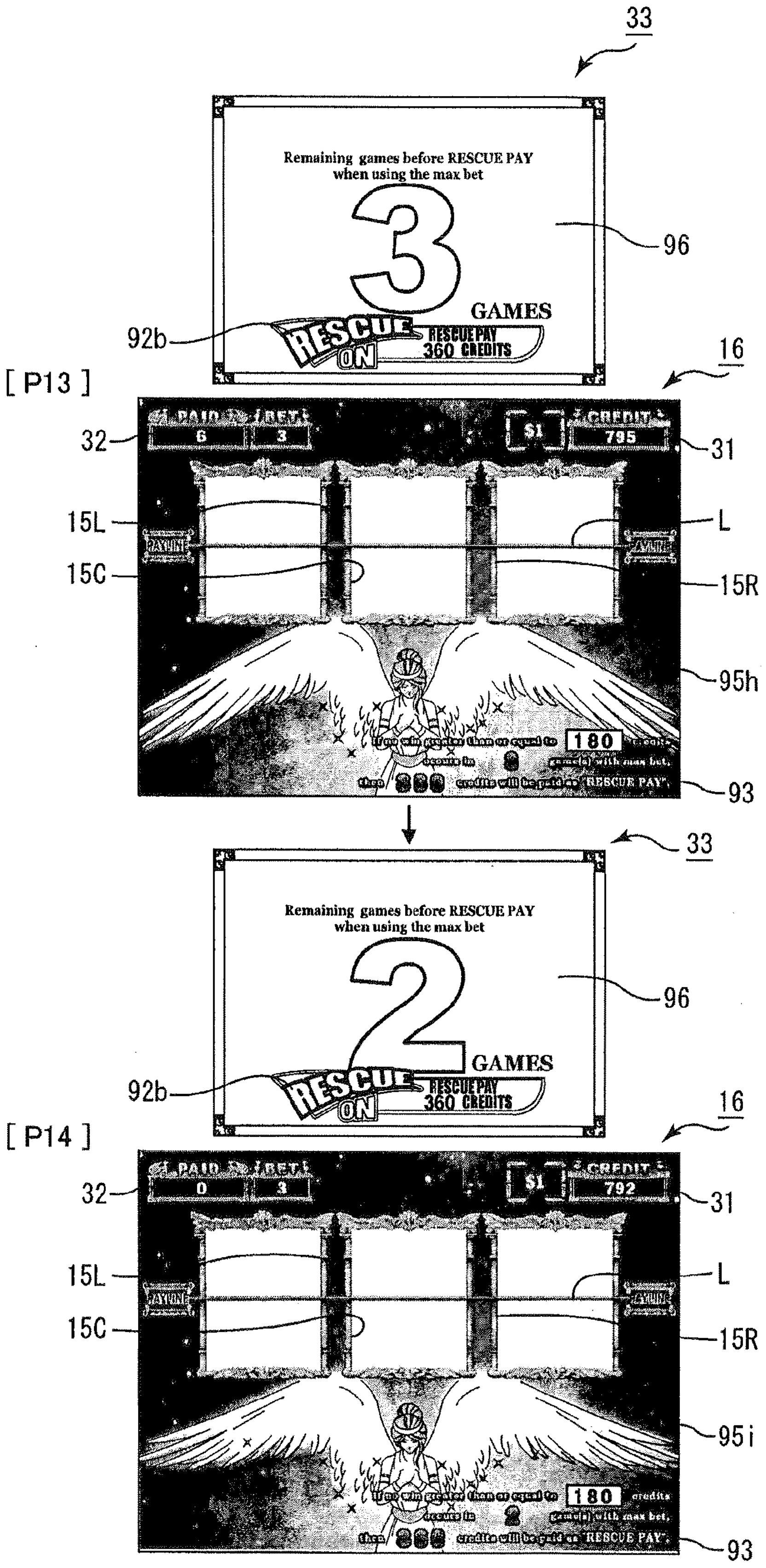
FIG. 9 is another view showing exemplary images displayed to the slot machine shown in FIG. 1.
Figure 10:
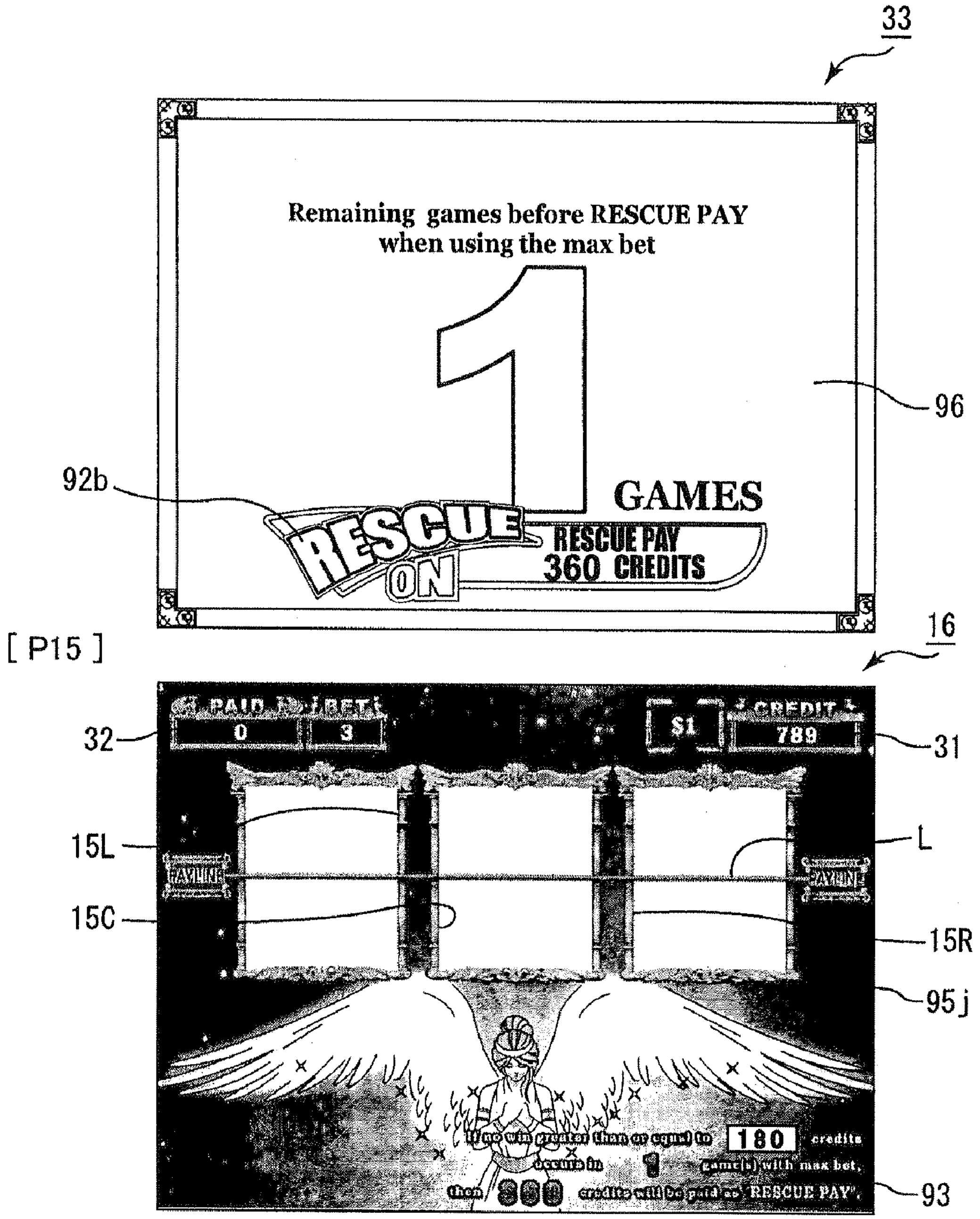
FIG. 10 is another view showing exemplary images displayed to the slot machine shown in FIG. 1.

However, an effect image 94*e* corresponding to the combination of symbols "BAR"-"BAR"-"BAR" is not displayed, and the specific effect image 95*c* is displayed as in [P08] (see FIG. 7). Other images are also displayed as in [P08].

[P21]

Figure 13:
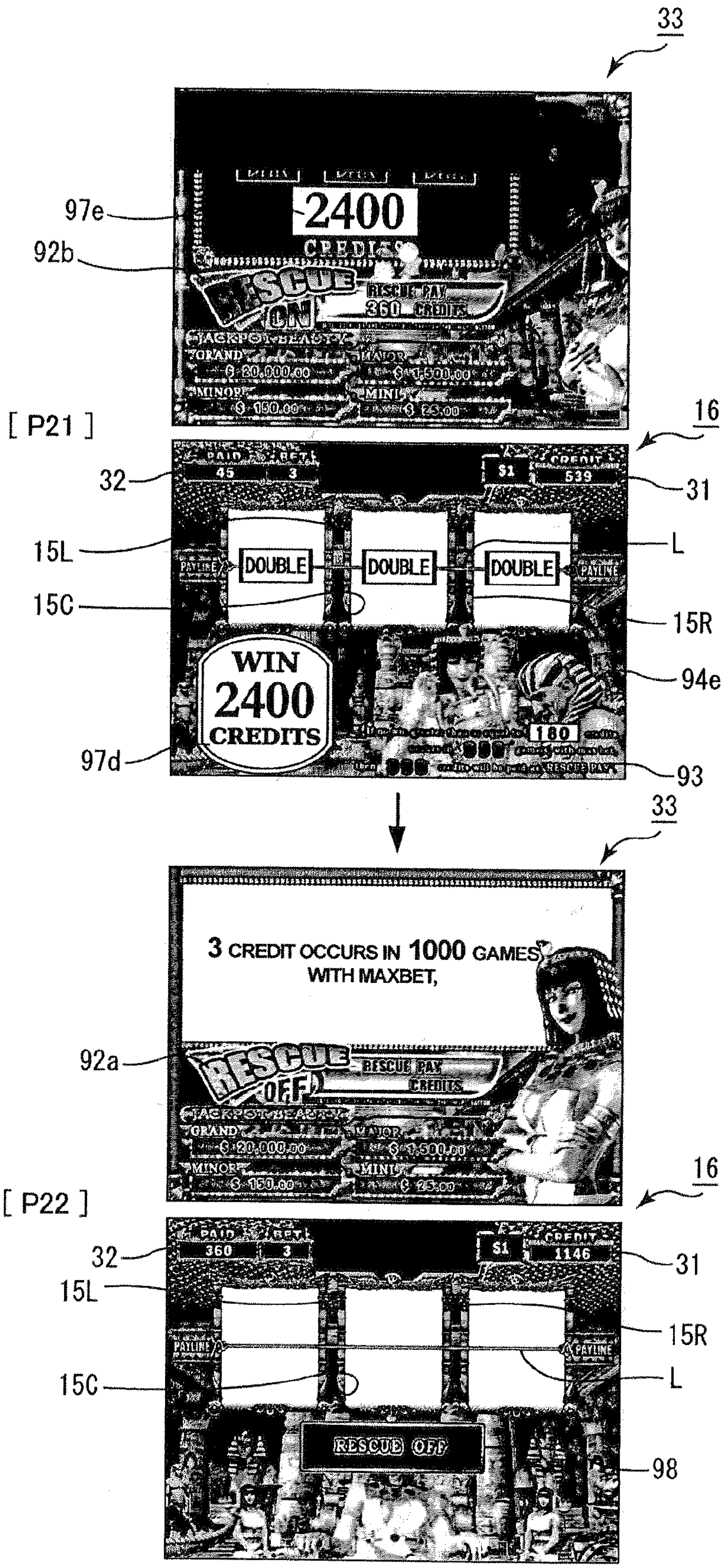
FIG. 13 is another view showing exemplary images displayed to the slot machine shown in FIG. 1.

In the insurance mode, when a combination of symbols "DOUBLE"-"DOUBLE"-"DOUBLE" accompanied by a payout of equal to or more than 180 coins is established, an image 97*e* showing "2400 CREDITS" is displayed to the upper image display panel 33 as shown in FIG. 13. The image 97*e* is an image showing the number of coins to be paid out according to the combination of symbols "DOUBLE"-"DOUBLE"-"DOUBLE".

Further, the image 92*b* showing "RESCUE ON" is displayed to the upper image display panel 33. The image 92*b* is an image showing that the current gaming state is the insurance mode.

An effect image 94*e* corresponding to the combination of symbols "DOUBLE"-"DOUBLE"-"DOUBLE" is displayed to the lower image display panel 16. Also, to the lower image display panel 16, there are displayed the image 93 showing the number of games left to be played until the number of games to be counted reaches a specific number, and an image 97*d* showing the number of coins to be paid out according to the combination of symbols "DOUBLE"-"DOUBLE"-"DOUBLE".

[P22]

In the insurance mode, when a combination of symbols accompanied by a payout of equal to or more than 180 coins is established, the mode is shifted from the insurance mode to the non-insurance mode.

At this time, the image 92*a* showing "RESCUEOFF" is displayed to the upper image display panel 33. The image 92*a* is an image showing that the current gaming state is the non-insurance mode.

Further, the image 98 showing "RESCUE OFF" is displayed to the lower image display panel 16. The image 98 is an image showing that the mode has been shifted from the insurance mode to the non-insurance mode.

Next, processing conducted in the slot machine 10 are described.

[Main Processing]

Figure 14:
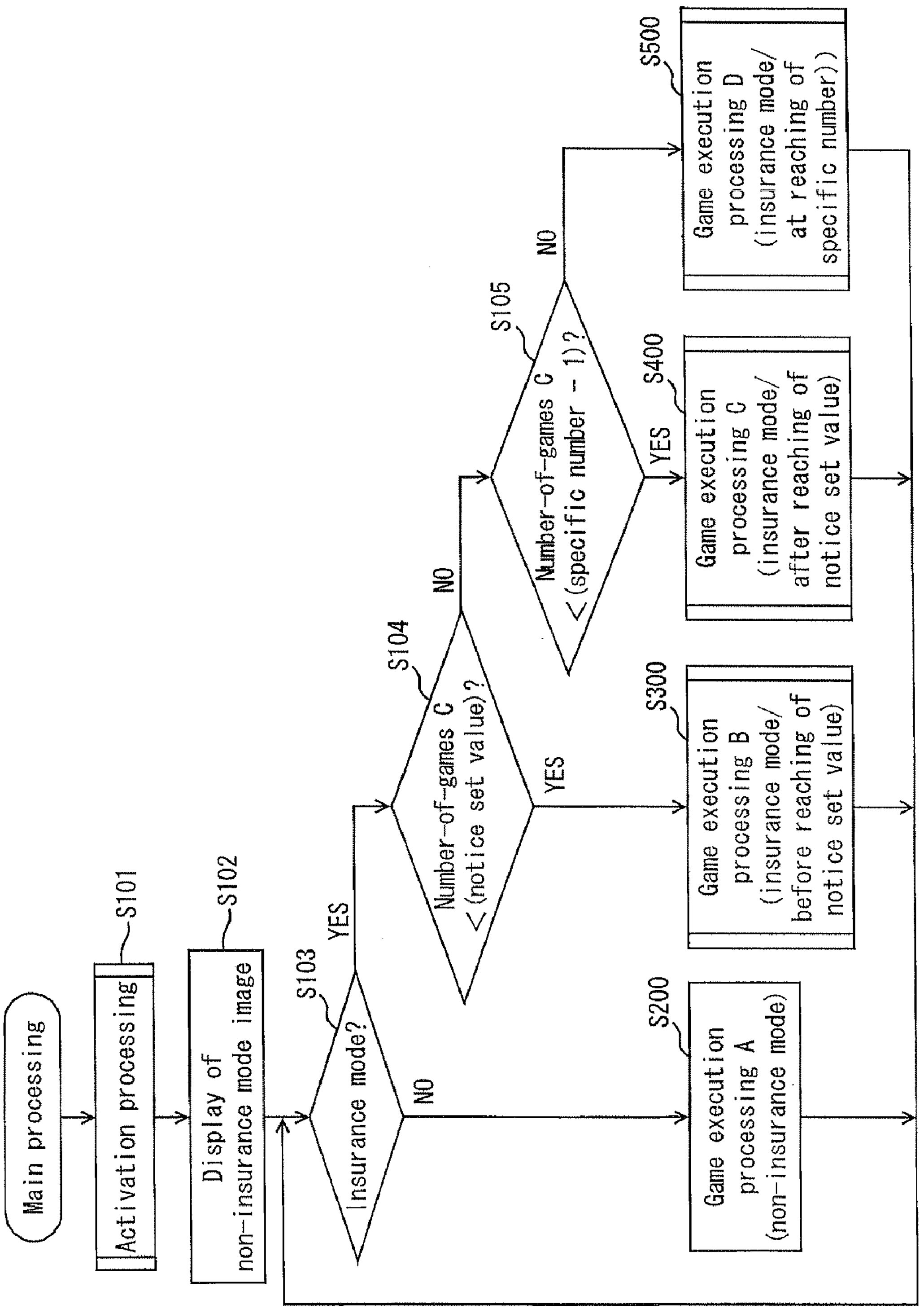
FIG. 14 is a flowchart showing main processing executed in the slot machine shown in FIG. 1.

FIG. 14 is a flowchart showing main processing performed in the slot machine 10.

First, activation processing is conducted in the slot machine 10 (step S101). The activation processing is specifically described later by using FIG. 25.

It is to be noted that, upon receipt of a detection signal outputted from the coin counter 21C when a coin inserted into the coin receiving slot 21 is detected by the coin counter 21C after the activation processing, the main CPU 41 conducts processing for adding the amount of inserted coins to the number of credits stored in the RAM 43 as interruption processing.

After the processing of step S101, the non-insurance mode is displayed in the slot machine 10 (step S102). In this processing, the main CPU 41 transmits a drawing command of the non-insurance mode image to the graphic board 68. On the graphic board 68, based on the above-mentioned drawing command, the VDP extracts image data from the RAM 43, expands it into a video RAM, generates image data of one frame, and outputs this image data to the upper image display panel 33 and the lower image display panel 16. This results in display of an image, for example as shown in [P01] (see FIG. 4), to the upper image display panel 33 and the lower image display panel 16.

Next, the main CPU 41 determines whether or not the current gaming state is the insurance mode, namely whether or not the insurance mode flag stored in the RAM 43 is "ON" (step S103).

When determining that the current gaming state is not the insurance mode in step S103, the main CPU 41 executes game execution processing A (non-insurance mode) (step S200), and then returns the processing to step S103. The game execution processing A is specifically described later by using FIG. 16.

On the other hand, when determining that the current gaming state is the insurance mode in step S103, the main CPU 41 then determines whether or not the number-of-games C stored in the RAM 43 is less than the notice set value (990 in the present embodiment) (step S104).

When determining that the number-of-games C is less than the notice set value in step S104, the main CPU 41 executes game execution processing B (insurance mode/before reaching the notice set value) (step S300), and then returns the processing to step S103. The game execution processing B is specifically described later by using FIG. 17.

On the other hand, when determining that the number-of-games C is not less than the notice set value in step S104, namely the number-of-games C is equal to or more than the notice set value, the main CPU 41 determines whether or not the number-of-games C stored in the RAM 43 is less than a value (999) smaller than the specific number by one (step S105).

When determining that the number-of-games C is less than the value smaller than the specific number by one in step S105, the main CPU 41 executes game execution processing C (insurance mode/after reaching the notice set value) (step S400) since the number-of-games C will not reach the specific number in the next game, and then main CPU 41 returns the processing to step S103. The game execution processing C is specifically described later by using FIG. 18.

When determining that the number-of-games C is the value smaller than the specific number by one in step S105, the main CPU 41 executes game execution processing D (insurance mode/at reaching of specific number) (step S500) since the number-of-games C may reach the specific number in the next game, and then the main CPU 41 returns the processing to step S103. The game execution processing D is specifically described later by using FIG. 19.

In the slot machine 10, insurance setting processing is conducted in a predetermined cycle when the non-insurance mode image is displayed (see [P01] in FIG. 4) as described above.

Figure 15:
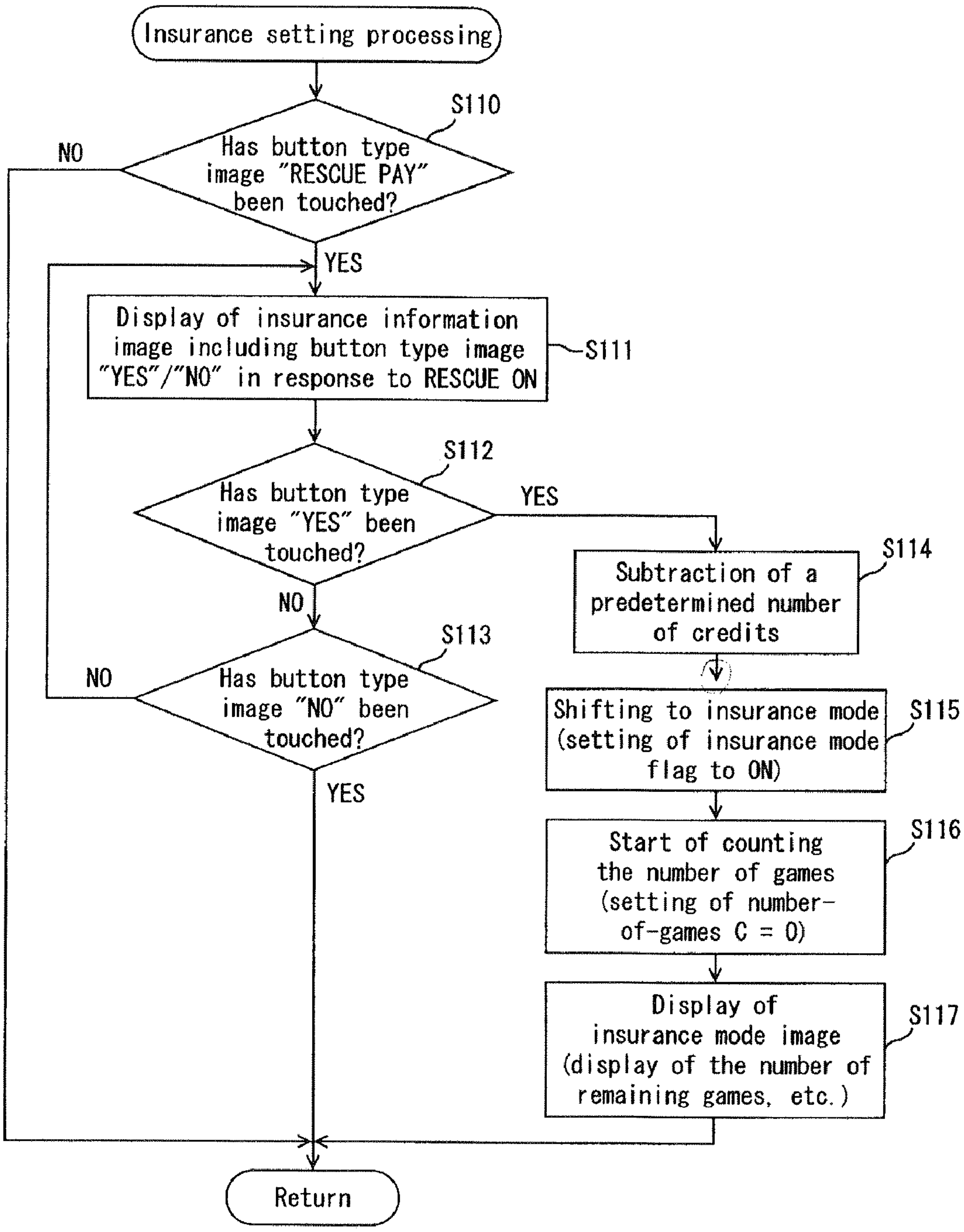
FIG. 15 is a flowchart showing a subroutine of insurance setting processing.

FIG. 15 is a flowchart showing a subroutine of the insurance setting processing.

First, the main CPU 41 determines whether or not the button type image "RESCUE PAY" 90*a* included in the image shown in [P01] displayed to the lower image display panel 16 has been touched, namely, whether or not to have received a detection signal that is outputted from the touch panel 69 when a predetermined place of the touch panel 69 corresponding to the display area of the button type image 90*a* is touched (step S110). When the main CPU 41 determines that the button type image 90*a* has not been touched, the present subroutine is terminated.

On the other hand, when determining that the button type image 90*a* has been touched, the main CPU 41 displays an insurance information image (see [P02] in FIG. 4), including the button type image "YES" 91*a* and the button type image "NO" 91*b* for responding to "RESCUE ON", to the lower image display panel 16 (step S111).

Next, the main CPU 41 determines whether or not the button type image "YES" 91*a* has been touched (step S112). When determining that the button type image "YES" 91*a* has not been touched in step S112, the main CPU 41 then determines whether or not the button type image "NO" 91*b* has been touched (step S113). When the main CPU 41 determines that the image "NO" 91*b* has been touched, the present subroutine is terminated. On the other hand, when the main CPU 41 determines that the image "NO" 91*b* has not been touched, the processing is returned to step S111.

When the button type image "YES" 91*a* has been touched in step S112, the main CPU 41 conducts processing for subtracting a predetermined number of credits (1 in the present embodiment) from the number of credits stored in the RAM 43 (step S114).

It should be noted that bills or coins that correspond to the number of credits may be inserted in place of subtracting the number of credits.

Next, the main CPU 41 sets the insurance mode flag stored in the RAM 43 to "ON" so as to shift the mode to the insurance mode (step S115).

The main CPU 41 then sets the number-of-games C to zero (the number-of-games C=0) in the data storage area showing the number-of-games C which is provided in the RAM 43, and starts counting the number of games (step S116).

Subsequently, the main CPU 41 displays the insurance mode images shown in [P03] (see FIG. 5) to the upper image display panel 33 and the lower image display panel 16 (step S117). The insurance mode image includes the image 93 showing the number of games left to be played until the number of games to be counted reaches the specific number, and some other images. After the processing of step S117, the present subroutine is terminated.

[Game Execution Processing A (Non-Insurance Mode)]

Figure 16:
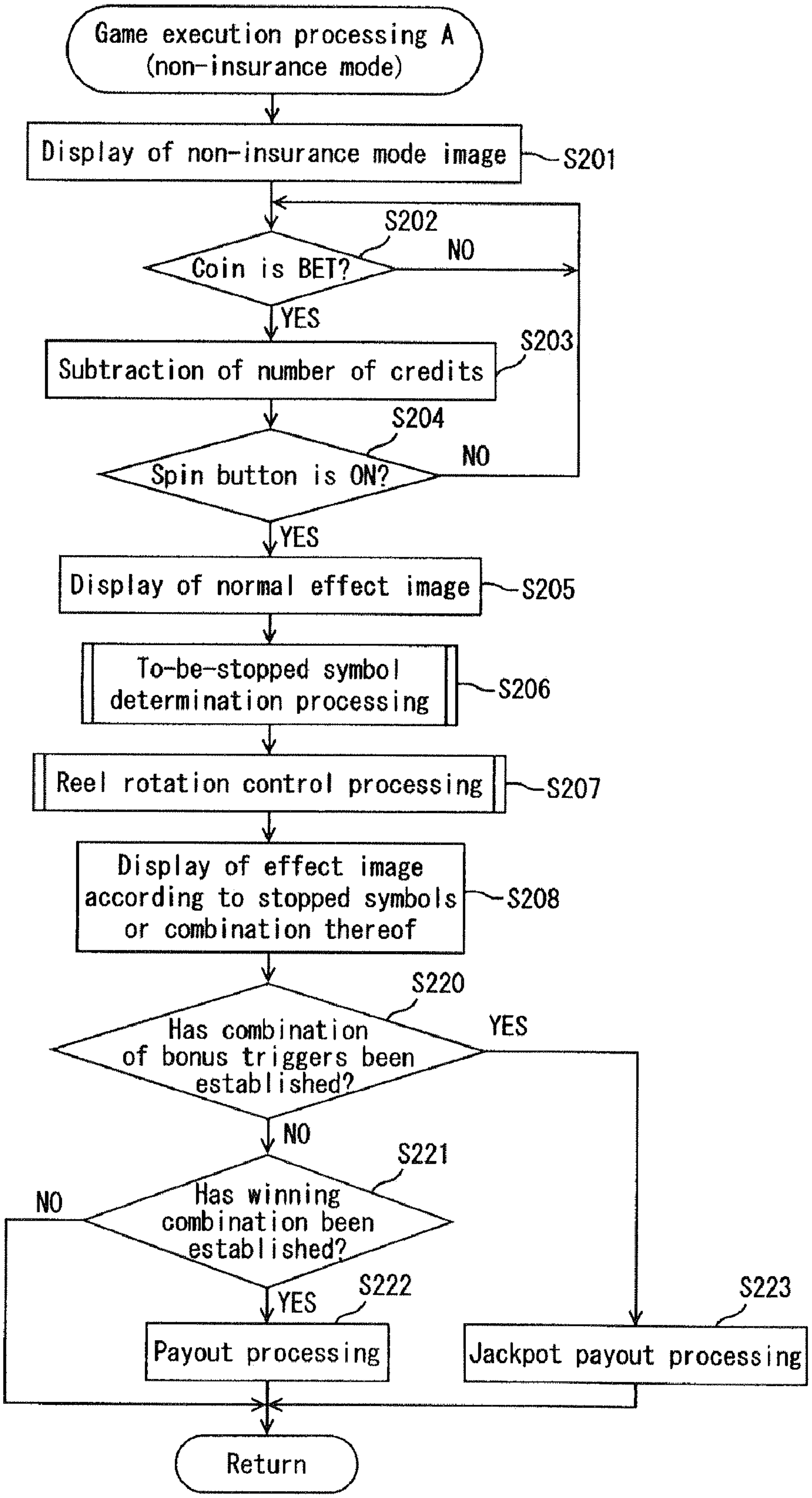
FIG. 16 is a flowchart showing a subroutine of game execution processing A (non-insurance mode).

FIG. 16 is a flowchart showing a subroutine of the game execution processing A called and executed in step S200 of the subroutine shown in FIG. 14.

First, the main CPU 41 conducts processing for displaying the non-insurance mode image (see [P01] in FIG. 4) to the upper image display panel 33 and the lower image display panel 16 (step S201).

Next, the main CPU 41 determines whether or not a coin has been BET (step S202). In this processing, the main CPU 41 determines whether or not to have received an input signal that is outputted from the 1-BET switch 26S when the 1-BET button 26 is operated, or an input signal that is outputted from a maximum BET switch 27S when the maximum BET button 27 is operated. When the main CPU 41 determines that the coin has not been BET, the processing is returned to step S202.

On the other hand, when determining that the coin has been BET in step S202, the main CPU 41 conducts processing for making a subtraction from the number of credits stored in the RAM 43 according to the number of coins BET (step S203). It is to be noted that, when the number of coins BET is larger than the number of credits stored in the RAM 43, the main CPU 41 does not conduct the processing for making a subtraction from the number of credits stored in the RAM 43, and the processing is returned to step S202. Further, when the number of coins BET exceeds the upper limit of the number of coins that can be BET in one game (three coins in the present embodiment), the main CPU 41 does not conduct the processing for making a subtraction from the number of credits stored in the RAM 43, and the processing is proceeded to step S204.

Next, the main CPU 41 determines whether or not the spin button 23 has been turned ON (step S204). In this processing, the main CPU 41 determines whether or not to have received an input signal that is outputted from the spin switch 23S when the spin button 23 is pressed.

When the main CPU 41 determines that the spin button 23 has not been turned on, the processing is returned to step S202.

It is to be noted that, when the spin button 23 is not turned ON (e.g. when the spin button 23 is not turned ON and a command to end the game is inputted), the main CPU 41 cancels a subtraction result in step S203.

In the present embodiment, a case is described where, after a coin is BET (step S202), the processing for making a subtraction from the number of credits is conducted (step S203) before it is determined whether or not the spin button 23 has been turned ON (step S204). However, the present invention is not limited to this example. For example, it may be determined whether or not the spin button 23 has been turned ON (step S204) after a coin is BET (step S202), and when it is determined that the spin button 23 has been turned ON (step S204: YES), the processing for making a subtraction from the number of credits may be conducted (step S203).

On the other hand, when determining that the spin button 23 has been turned ON in step S204 in FIG. 16, the main CPU 41 conducts processing for displaying a normal effect image (e.g. the normal effect image 94*a*). In the present embodiment, the normal effect image 94 had been displayed before the spin button 23 is turned ON, and another normal effect image 94 is displayed after the spin button 23 is turned ON. It should be noted that, in the present invention, the normal effect image 94 may be displayed after the spin button 23 is turned ON.

Next, the main CPU 41 conducts to-be-stopped symbol determination processing (step S206). In this to-be-stopped symbol determination processing, the main CPU 41 (arithmetic processing unit) executes a to-be-stopped symbol determination program stored in the RAM 43 (storage device) so as to determine a code No. in stopping the reels 14. Thereby, a combination of symbols to be rearranged is determined. This processing is specifically described later by using FIGS. 26 and 29.

It should be noted that, in the present embodiment, a case is described where a combination of symbols to be rearranged is determined so as to determine one winning combination out of a plurality of types of winning combinations. However, in the present invention, for example, a random number may be used first so as to determine one winning combination to be selected randomly from the plurality of types of winning combinations, and thereafter, a combination of symbols to be rearranged may be determined based on the above-mentioned winning combination.

Next, the main CPU 41 conducts reel rotation control processing (step S207). This is the processing for starting rotation of all the reels 14 and then stopping rotation of the reels 14 so that the combination of symbols corresponding to the winning combination determined in step S206 is rearranged along the winning line L. This processing is specifically described later by using of FIGS. 27 to 29. Next, the main CPU 41 displays to the lower image display panel 16 an effect image according to rearranged symbols or a combination thereof (step S208).

Next, the main CPU 41 determines whether or not a combination of bonus triggers has been established (step S220). When it is determined that the combination of bonus triggers has been established, a single jackpot is selected out of four types of jackpots "GRAND", "MAJOR", "MINOR" and "MINI", and the number of coins set with respect to the selected jackpot is paid out (step S223). In the case of accumulating coins, the main CPU 41 conducts processing for adding a predetermined number of credits to the number of credits stored in the RAM 43. On the other hand, in the case of paying out coins, the main CPU 41 transmits a control signal to the hopper 66 in order to pay out a predetermined number of coins. At that time, the coin detecting portion 67 counts the number of coins paid out from the hopper 66, and when the counted value reaches a designated number, the coin detecting portion 67 transmits a payout completion signal to the main CPU 41. Thereby, the main CPU 41 stops driving of the hopper 66 and ends the coin payout processing. Thereafter, the present subroutine is terminated.

On the other hand, in step S220, when determining that the combination of bonus triggers has not been established, the main CPU 41 determines whether or not a winning combination has been established (step S221). When determining that the winning combination has been established, the main CPU 41 pays out coins according to the number of BETs and the winning combination (step S222). When it is determined that any of winning combinations has not been established in step S221, or when the processing of step S222 or S223 is executed, the present subroutine is terminated.

[Game Execution Processing B (Insurance Mode/Before Reaching of Notice Set Value)]

Figure 17:
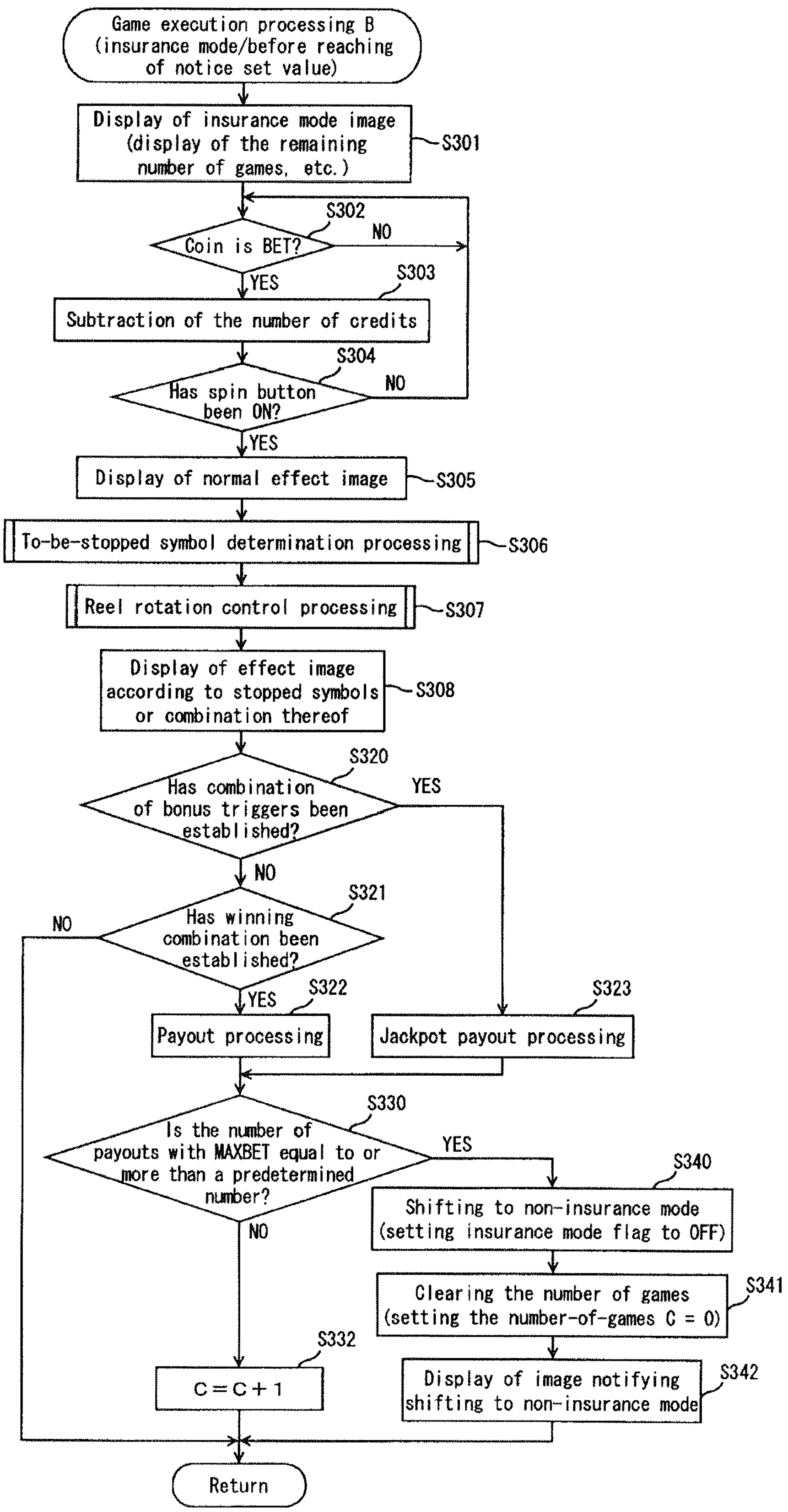
FIG. 17 is a flowchart showing a subroutine of game execution processing B (insurance mode/before reaching of notice set value).

FIG. 17 is a flowchart showing a subroutine of the game execution processing B which is called and executed in step S300 of the subroutine shown in FIG. 14.

First, the main CPU 41 conducts processing for displaying the insurance mode image (see [P03 in FIG. 5]) to the upper image display panel 33 and the lower image display panel 16 (step S301).

Subsequently, processing of steps S302 to S307 are conducted, and the processing are similar to the processing of steps S202 to S207 shown in FIG. 16.

Next, the main CPU 41 displays to the lower image display panel 16 an effect image (see [P04], [P05] in FIG. 5) according to rearranged symbols or a combination thereof (step S308).

Next, the main CPU 41 determines whether or not a combination of bonus triggers has been established (step S320), and when determining that the combination of bonus triggers has been established, the main CPU 41 conducts jackpot payout processing (step S323).

On the other hand, when determining that the combination of bonus triggers has not been established in step S320, the main CPU 41 determines whether or not a winning combination has been established (step S321). When determining that the winning combination has been established, the main CPU 41 pays out coins according to the number of BETs and the winning combination (step S322). When it is determined that any winning combination has not been established in step S321, the processing is shifted to step 330.

When executing the processing of step S322 or S323, the main CPU 41 determines whether or not the current game is a game with a MAXBET and the number of coin-outs in step S322 or step S323 is equal to or more than a predetermined number (180 in the present embodiment) (step S330).

In step S330, when determining that the current game is a game with a MAXBET and the number of coin-outs is not equal to or more than the predetermined number, the main CPU 41 adds the number-of-games C (C=C+1) stored in the RAM 43 (step S332), and ends the present subroutine.

In step S330, when determining that the current game is a game with a MAXBET and the number of coin-outs is equal to or more than the predetermined number (180), the main CPU 41 sets the insurance mode flag stored in the RAM 43 to "OFF", to shift the mode to the non-insurance mode (step S340).

Next, in the storage area of data showing the number-of-games C which is provided in the RAM 43, the main CPU 41 sets the number-of-games C to zero (C=0) so as to clear the number of games (step S341).

Subsequently, the main CPU 41 displays, to the lower image display panel 16, the image 98 (see [P22] in FIG. 13) showing that the mode has been shifted from the insurance mode to the non-insurance mode (step S342), and ends the present subroutine.

[Game Execution Processing C (Insurance Mode/After Reaching of Notice Set Value)]

Figure 18:
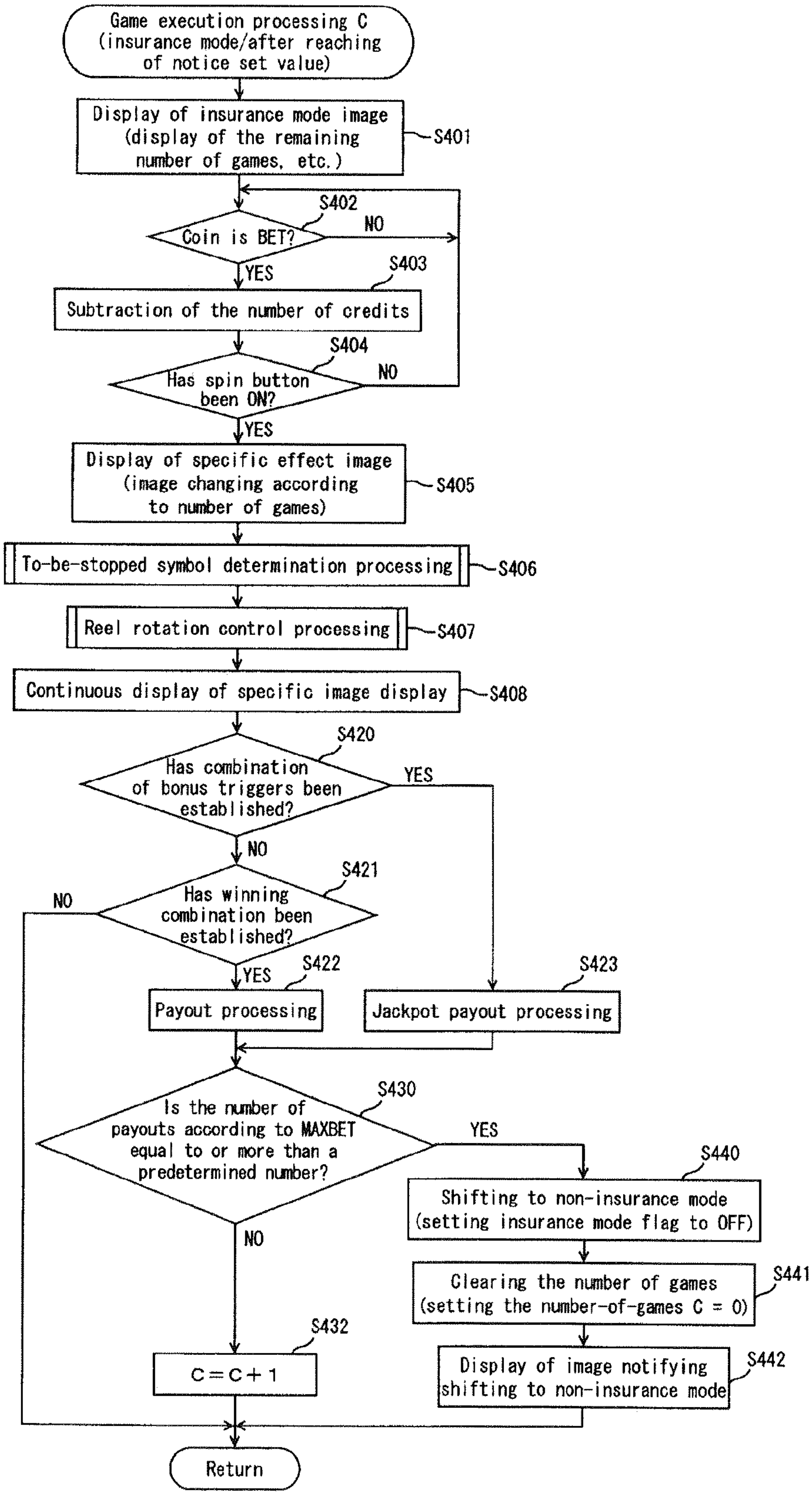
FIG. 18 is a flowchart showing a subroutine of game execution processing C (insurance mode/after reaching of notice set value).

FIG. 18 is a flowchart showing a subroutine of the game execution processing C which is called and executed in step S400 of the subroutine shown in FIG. 14.

First, the main CPU 41 conducts processing for displaying the insurance mode image to the upper image display panel 33 and the lower image display panel 16 (step S301).

Subsequently, processing of steps S402 to S404 are conducted, and the processing of those steps is similar to the processing of steps S202 to S204 shown in FIG. 16.

Next, the main CPU 41 displays specific effect images 95*a* to 95*i* (see [P06] to [P14] in FIGS. 6 to 9) to the lower image display panel 16 (step S405).

As described above, the specific effect image 95 is a video picture of an action of an angel as a character who appears and spreads her wings, and the specific effect images 95*a* to 95*j* are made by dividing the specific effect image 95 into a plurality of images along the time axis.

Therefore, with increase in number of games, the action of the angel as the character who appears and gradually spreads her wings is displayed by the specific effect image 95.

Subsequently, processing for steps S406 and S407 are performed, and the processing of these steps is similar to the processing of steps S206 and S207 shown in FIG. 16.

After the processing of step S407, the main CPU 41 conducts processing for continuously displaying the specific effect image 95 even after rotation of the reels 14 has been stopped (step S408).

It is to be noted that, in the processing shown in FIG. 18, when symbols or a combination thereof, accompanied by coin-outs, is established, the main CPU 41 does not display the effect image 94*e* which is displayed according to the symbols or the combination thereof as shown in [P19] (see FIG. 12). In place of that, the main CPU 41 displays the image 97*c* showing the number of coin-outs according to the symbols or the combination thereof while displaying the specific effect image 95 as shown in [P20] (see FIG. 12).

Thereafter, processing of the steps S420 to S423, S430 to S432, and S440 to S442, which correspond to the respective processing of the steps S320 to S323, S330 to S332, and S340 to S342 shown in FIG. 17 are carried out.

[Game Execution Processing D (Insurance Mode/at Reaching of Specific Number)]

Figure 19:
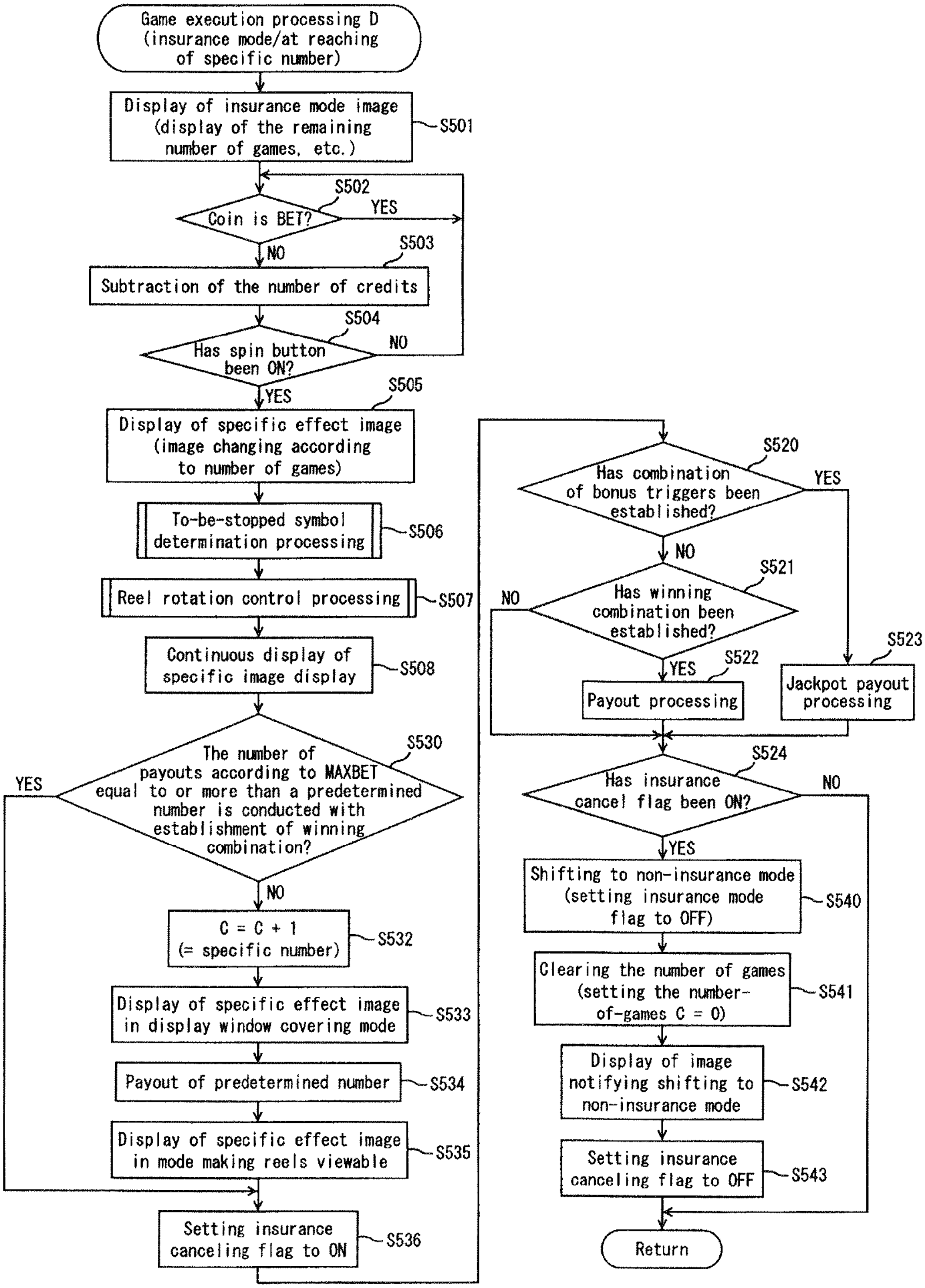
FIG. 19 is a flowchart showing a subroutine of game execution processing D (insurance mode/at reaching of a specific number).

FIG. 19 is a flowchart showing a subroutine of the game execution processing D which is called and executed in step S500 of the subroutine shown in FIG. 14.

First, the main CPU 41 conducts processing for displaying the insurance mode image to the upper image display panel 33 and the lower image display panel 16 (step S501).

Subsequently, processing of steps S502 to S504 are conducted, and the processing of these steps is similar to the processing of steps S202 to S204 shown in FIG. 16.

Next, the main CPU 41 displays a specific effect image 95*j* (see [P15] in FIG. 10) to the lower image display panel 16 (step S505).

The specific effect image 95*j* has contents continued from the specific effect images 95*a* to 95*i*, and displays an action of the angel as the character having spread her wings.

Subsequently, processing of steps S506 to S508 is conducted, and the processing of these steps is similar to the processing of steps S206 to S208 shown in FIG. 16.

After the processing of step S507, the main CPU 41 conducts processing for continuously displaying the specific effect image 95*j* even after rotation of the reels 14 has stopped (step S508).

It is to be noted that in the processing shown in FIG. 19, as in FIG. 18, when symbols or a combination thereof, accompanied by coin-outs (the symbols or a combination thereof with which the number of coin-outs reaches less than the predetermined number), is established, the main CPU 41 displays the image 97*c* showing the number of coin-outs according to the symbols or the combination thereof while displaying the specific effect image 95 as shown in [P20] (see FIG. 12).

Next, the main CPU 41 determines whether or not the current game is a game with a MAXBET and a game where coins are paid out in number equal to or more than a predetermined number (180 in the present embodiment) (step S530)

In step S530, when determining that the current game is a game with a MAXBET and is not a game where coins are paid out in number equal to or more than a predetermined number, the main CPU 41 adds the number-of-games C (=999) (step S532) stored in the RAM 43. Thereby, the number-of-games C reaches the specific number 1000.

Next, the main CPU 41 displays an image shown in [P16] to the upper image display panel 33 and the lower image display panel 16 (step S533).

Namely, the image 97*a* is displayed to the upper image display panel 33, the image 97*a* showing that coins are being paid out based on that the number of games in the insurance mode has reached a specific number, and the similar image 97*b* is also displayed to the lower left side of the lower image display panel 16.

Moreover, the specific effect image 95*h* with contents continued from the specific effect images 95*a* to 95*j* is displayed to the lower image display panel 16. Furthermore, the specific effect image 95*h*' is displayed in the display windows 15 (15L, 15C, 15R).

Subsequently, the main CPU 41 pays out a predetermined number (360 in the present embodiment) of coins while displaying the image shown in [P16] (step S534).

After the processing of step S534, the main CPU 41 stops display of the specific effect image 95*h*' in the display windows 15 while displaying the specific effect image 95*h* to the lower image display panel 16 so as to display the specific effect image 95 in such a manner as to make the reels 14 visible (step S535).

In step S530, when determining that the current game is a game with a MAXBET and a game where the number of coin-outs is equal to or more than the predetermined number, or when executing the processing of step S535, the main CPU 41 determines whether or not a combination of bonus triggers has been established, and when it determines that the combination of bonus triggers is established, the main CPU conducts jackpot payout processing (step S523).

On the other hand, in step S520, when determining that the combination of bonus triggers has not been established, the main CPU 41 determines whether or not a winning combination has been established (step S521), and when determining that the winning combination has been established, the main CPU 41 pays out coins according to the number of BETs and winning combination (step S522).

When determining that the winning combination has not been established in step S521 or executing the processing of step S522 or step S523, the main CPU 41 sets the insurance mode flag stored in the RAM 43 to "OFF" so as to shift the mode to the non-insurance mode (step S540).

Next, in the storage area of data showing the number-of-games C which is provided in the RAM 43, the main CPU 41 sets the number-of-games C to zero (C=0) so as to clear the number of games (step S541)

Subsequently, the main CPU 41 displays, to the lower image display panel 16, the image 98 (see [P18] in FIG. 11) showing that the mode has been shifted from the insurance mode to the non-insurance mode (step S542), and sets the insurance canceling flag to "OFF" (step S543). Thereafter, the present subroutine is terminated.

Further, the payout processing in step S534 and the payout processing in step S522 or S523 are not necessarily performed separately, but may be performed through a single payout processing by accumulating the number of coins to be paid out in advance and paying out the accumulated number of coins to be paid out through a single payout processing.

In the slot machine 10, remaining-credits monitoring processing is conducted at predetermined regular intervals.

Figure 20:
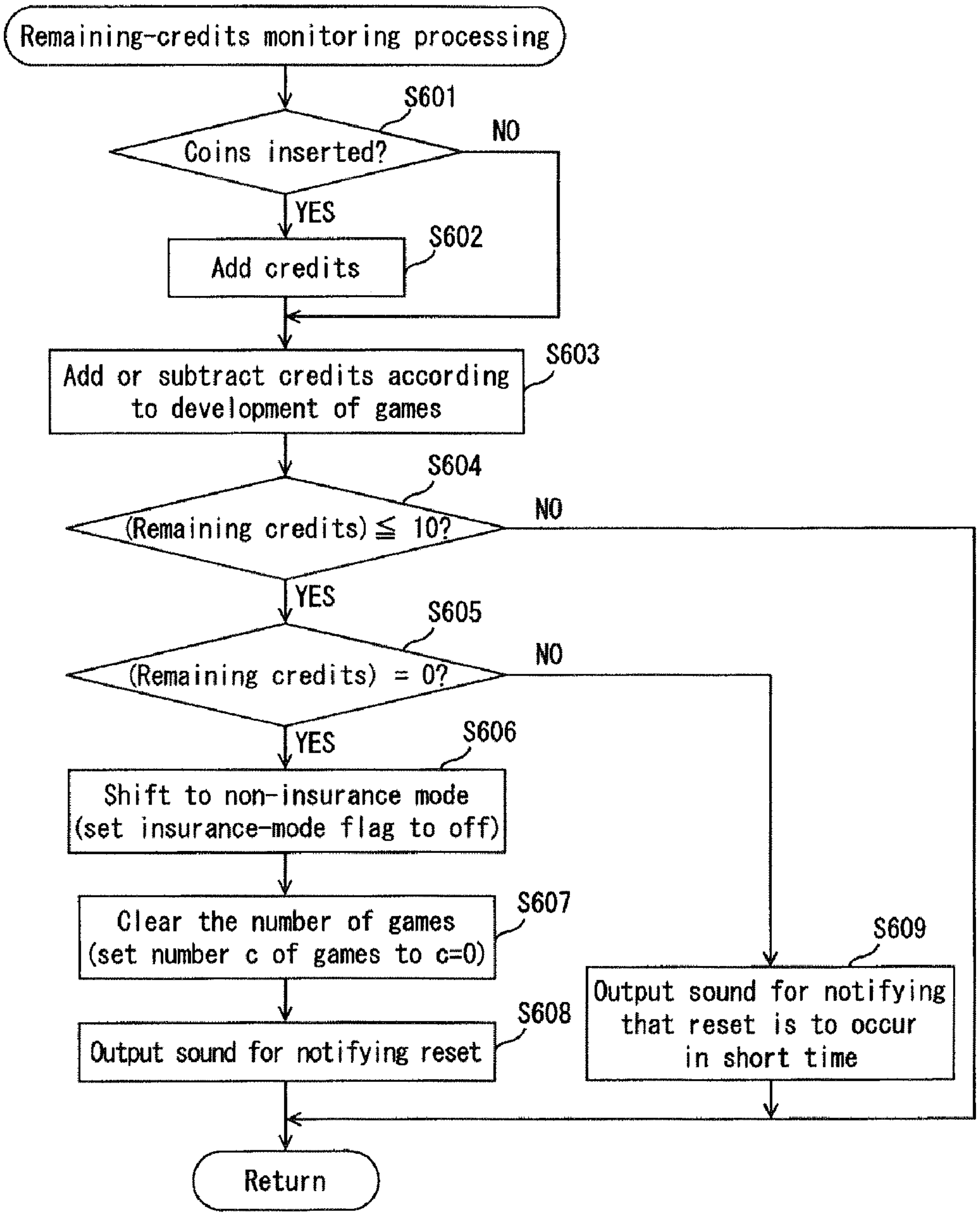
FIG. 20 is a flow chart illustrating the subroutine of remaining-credits monitoring processing.

FIG. 20 is a flow chart illustrating the subroutine of the remaining-credits monitoring processing.

First, the main CPU 41 determines whether or not coins have been inserted (step S601). When the main CPU 41 determines that coins have been inserted, the main CPU 41 adds the number of credits according to the number of inserted coins (step S602).

When the main CPU 41 determines in step S601 that no coin has been inserted or if the main CPU 41 has conducted the processing in step S602, the main CPU 41 adds or subtracts the number of credits, according to the development of the game. More specifically, when the symbols rearranged on the reels 14 establish a combination which causes payout of coins, the main CPU 41 adds the number of credits by a value corresponding to the combination and, if a BET is made, the main CPU 41 subtracts the number of credits by a value corresponding to the number of BETs.

Next, in step S604, the main CPU 41 determines whether or not the number of remaining credits is equal to or less than 10. When the number of remaining credits is not equal to or less than 10, the main CPU 41 ends the present subroutine. On the other hand, when the main CPU 41 determines that the number of remaining credits is equal to or less than 10, then the main CPU 41 determines whether or not the number of remaining credits is 0 (step S605).

When the main CPU 41 determines in step S605 that the number of remaining credits is 0, namely that there is no credit, the main CPU 41 sets the insurance-mode flag stored in the RAM 43 to "OFF" to cause the shift to the non-insurance mode (step S606) The condition that the number of remaining credits is 0 corresponds to a game ending condition.

Next, the main CPU 41 sets the number C of games to C=0 in the storage area for data indicative of the number C of games, which is provided in the RAM 43, to clear the number of games (step S607).

Next, the main CPU 41 causes the speaker 29 to output a sound (for example, "thunk") indicating that the mode has been shifted to the non-insurance mode (that the insurance has been reset) (step S608). At this time, the main CPU 41 also displays an image indicating that the mode has been shifted from the insurance mode to the non-insurance mode, on the lower image display panel 16. After conducting the processing in step S608, the main CPU 41 ends the present subroutine.

When the main CPU 41 determines in step S605 that the number of remaining credits is not 0, the main CPU 41 causes the speaker 29 to output a sound which notifies the player that the insurance is going to be reset in a short time (for example, a sound of a siren) (step S609) and ends the present subroutine.

In the slot machine 10, card-insertion-and-removal monitoring processing is conducted at predetermined regular intervals.

Figure 21:
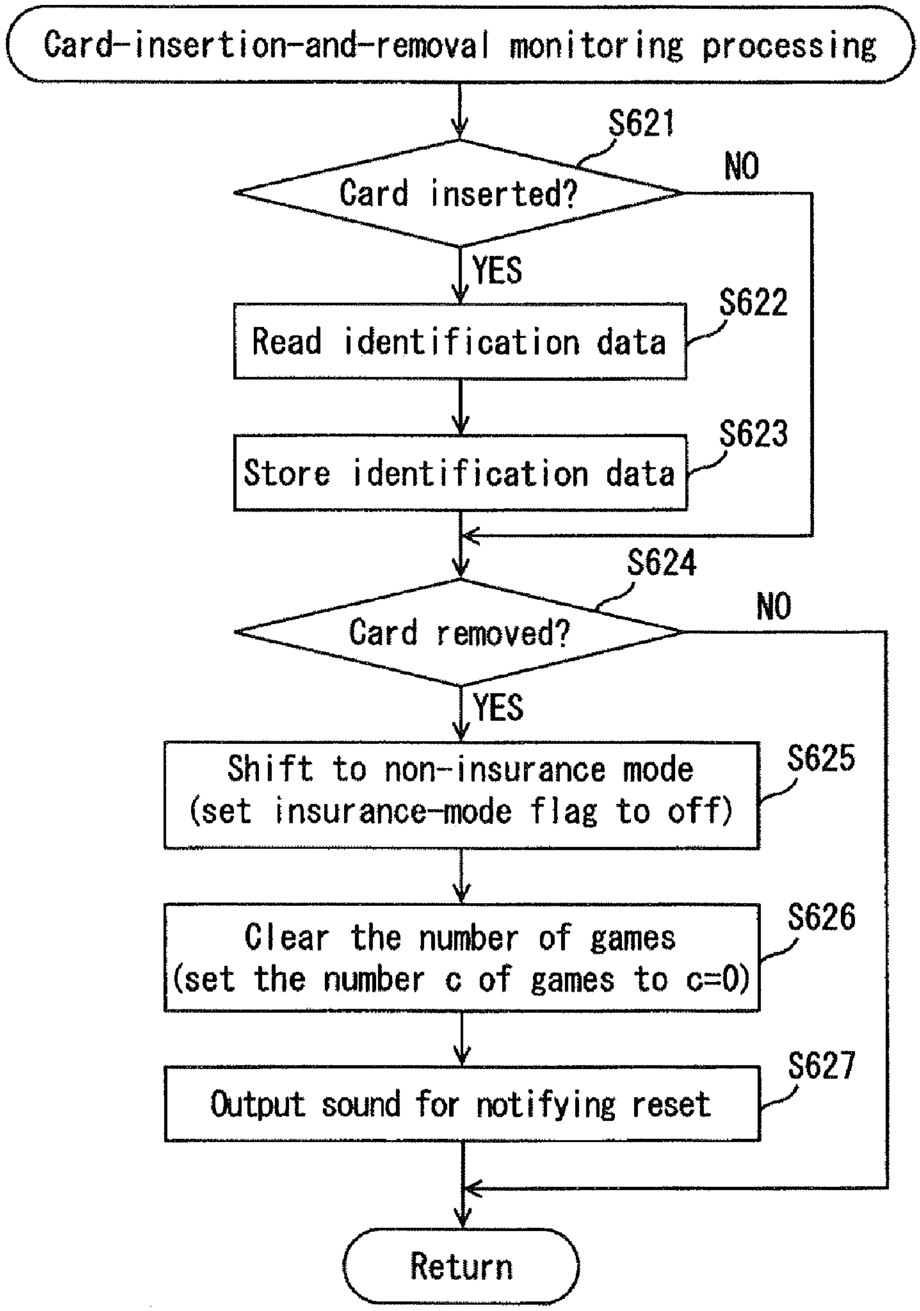
FIG. 21 is a flow chart illustrating the subroutine of card-insertion-and-removal monitoring processing.

FIG. 21 is a flow chart illustrating the subroutine of the card-insertion-and-removal monitoring processing.

First, the main CPU 41 determines whether or not a smart card has been inserted into the card slot 36*a*. For example, an optical sensor is provided inside of the card slot 36*a* to determine whether or not a smart card is inserted therein.

When the main CPU 41 determines in step S621 that a smart card has been inserted therein, then the main CPU 41 reads identification data from the smart card (step S622) and stores the read identification data in the RAM 43 (step S623).

When the main CPU 41 determines in step S621 that no card has been inserted or when the main CPU 41 has conducted the processing in step S623, the main CPU 41 determines whether or not the smart card has been removed (step S624). The condition that the smart card has been removed corresponds to a game ending condition according to the present invention. On the other hand, when the main CPU 41 determines that the smart card has been removed, then the main CPU 41 conducts processing in steps S625 to 627, which are a similar to the processing in steps S606 to 608 illustrated in FIG. 20. After the processing in step S627, the present subroutine ends.

In the slot machine 10, ticket output monitoring processing is conducted at predetermined regular intervals.

Figure 22:
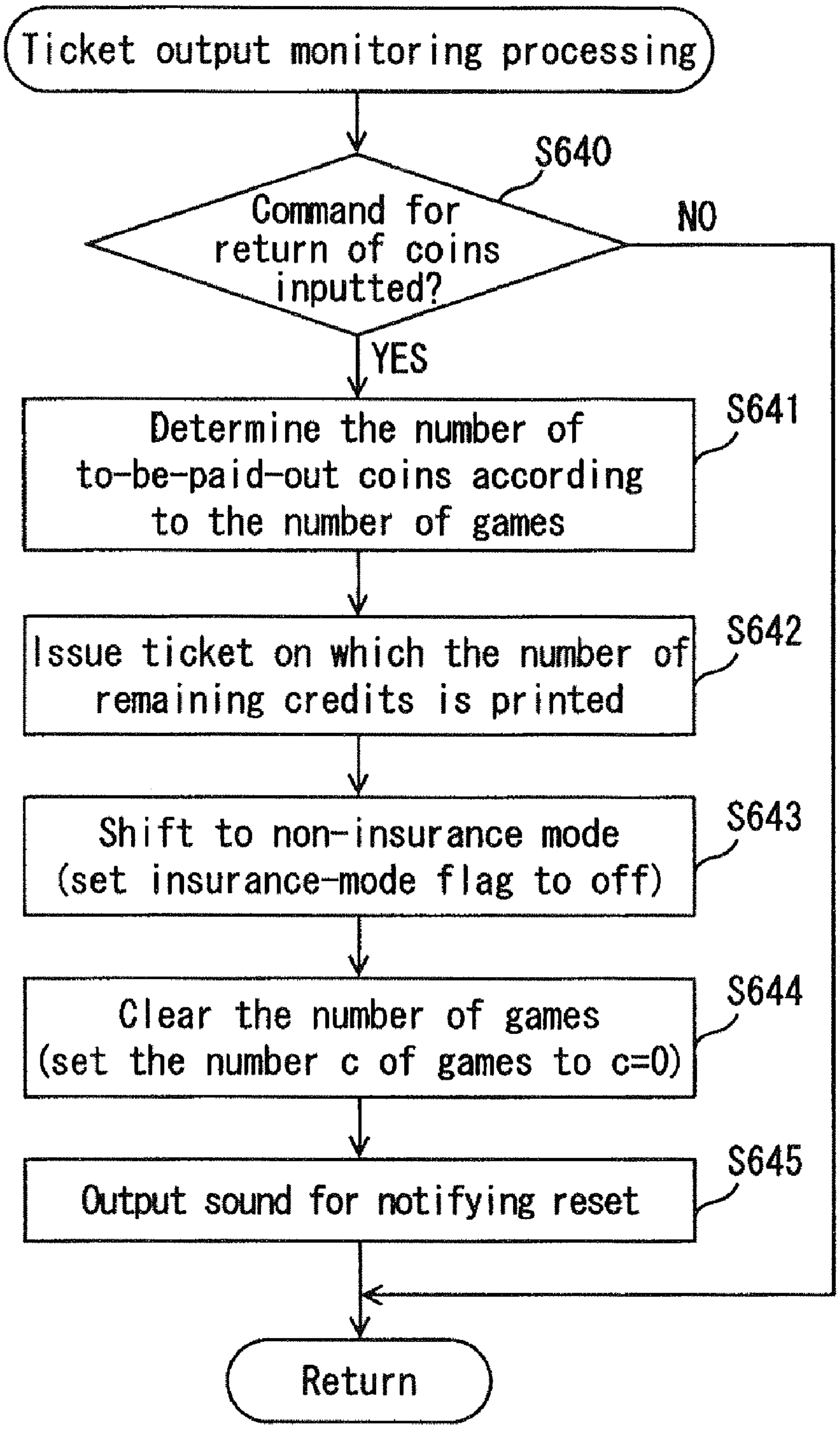
FIG. 22 is a flow chart illustrating the subroutine of ticket output monitoring processing.

FIG. 22 is a flow chart illustrating the subroutine of the ticket output monitoring processing.

First, the main CPU 41 determines whether or not it has received a signal output from the CASHOUT switch 25S to determine whether or not a command for return of coins has been inputted from the cash-out button 25 (step S640). The condition that a command for return of coins has been inputted corresponds to a game ending condition according to the present invention. When the main CPU 41 determines that a command for return of coins has been inputted, then the main CPU 41 refers to a number-of-paid-out-coins determination table stored in the RAM 43 and determines the number of coins to be paid out, according to the current number of games (step S641).

FIG. 23 is a view illustrating the number-of-paid-out-coins determination table.

The number-of-paid-out-coins determination table associates numbers of games with numbers of coins to be paid out. The number-of-paid-out-coins determination table is a lookup table. For example, when the number of games falls within the range of 0 to 300, 0 is selected as the number of to-be-paid-out coins.

Next, the main CPU 41 drives the ticket printer 35 for printing the number of remaining credits, resulted from the addition of the number of to-be-paid-out coins determined in step S641, onto a ticket and issuing the ticket (step S642).

Thereafter, the main CPU 41 conducts processing in steps S643 to 645, which are a similar to the processing in steps S606 to 608 illustrated in FIG. 20. After the processing in step S645, the present subroutine ends.

In the slot machine 10, elapsed-time monitoring processing is conducted at predetermined regular intervals.

Figure 24:
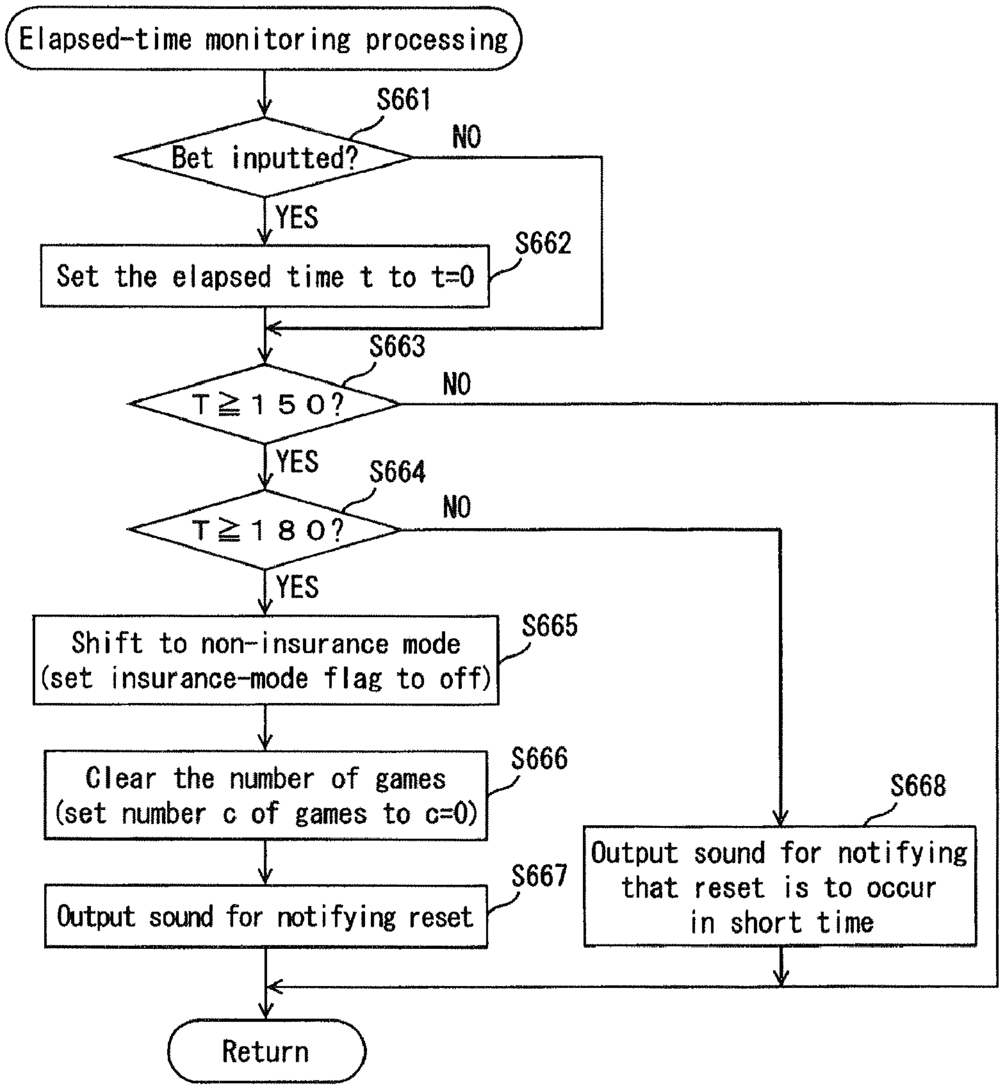
FIG. 24 is a flow chart illustrating the subroutine of elapsed-time monitoring processing.

FIG. 24 is a flow chart illustrating the subroutine of the elapsed-time monitoring processing.

First, the main CPU 41 determines whether or not a BET has been inputted (step S661). When the main CPU 41 determines that a BET has been inputted, the main CPU 41 sets the elapsed time T to 0 second (step S662).

When the main CPU 41 determines in step S661 that no BET has been inputted or when the main CPU 41 has conducted the processing in step S662, the main CPU 41 determines whether or not the elapsed time T is equal to or more than an advance notice period (150 seconds, in the present embodiment) (step S663). When the main CPU 41 determines that the elapsed time T is not equal to or more than the advance set time, it ends the present subroutine.

When the main CPU 41 determines in step S663 that the elapsed time T is equal to or more than the advance notice period, the main CPU 41 determines whether or not the elapsed time T is equal to or more than a certain time (180 seconds, in the present embodiment). The condition that the elapsed time T is equal to or more than the certain time corresponds to a game ending condition. When the main CPU 41 determines that the elapsed time T is equal to or more than the certain time, the main CPU 41 conducts processing in steps S665 to 667, which are the same as the processing in steps S606 to 608 illustrated in FIG. 20. After the processing in step S667, the present subroutine ends.

When the main CPU 41 determines in step S664 that the elapsed time T is not equal to or more than the advance notice period, the main CPU 41 causes the speaker 29 to output a sound notifying that the insurance is going to be reset in a short time (for example, a sound of a siren) (step S668) and ends the present subroutine.

[Activation Processing]

Figure 25:
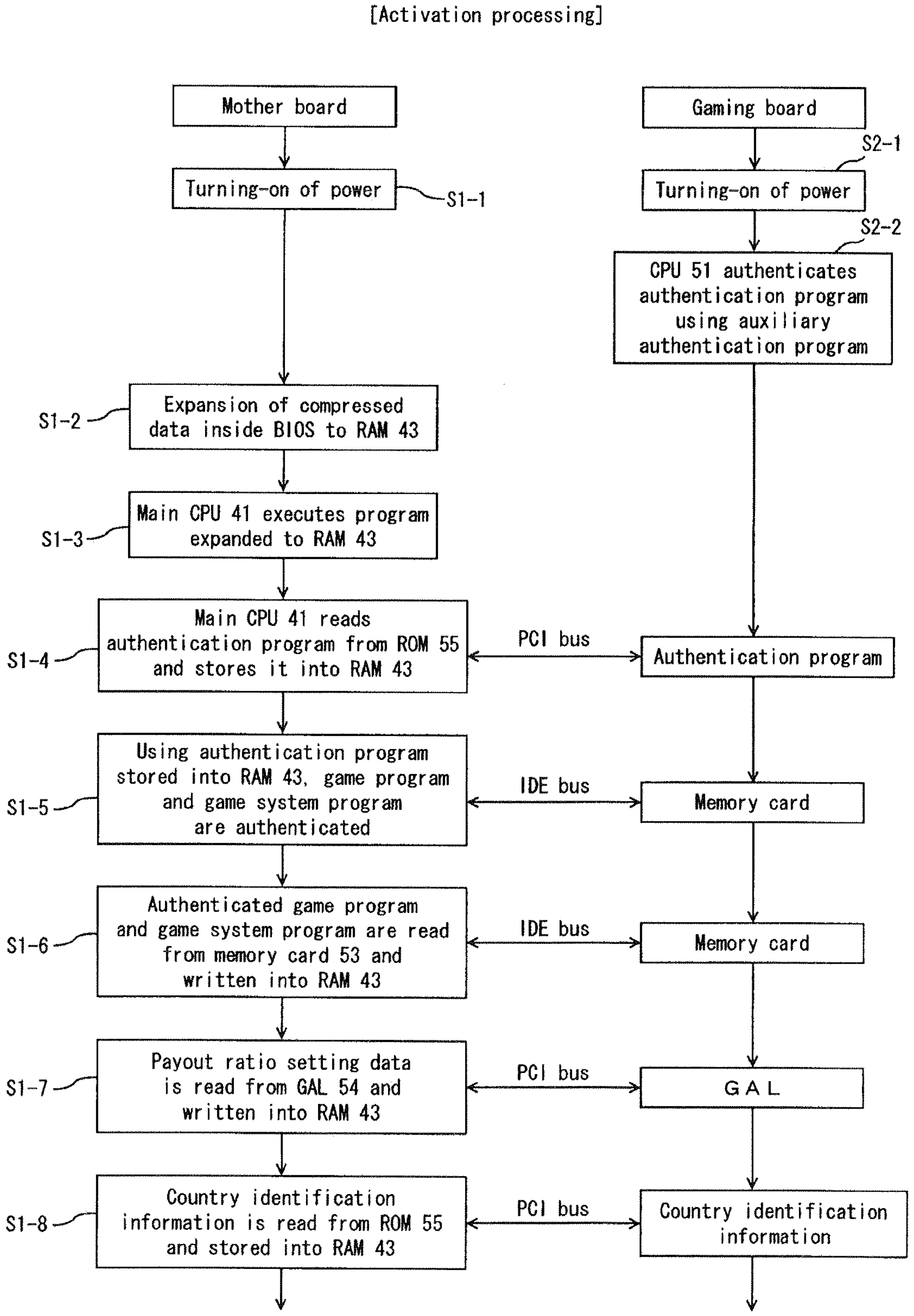
FIG. 25 is a chart showing a procedure of activation processing conducted by the mother board and the gaming board shown in FIG. 2.

FIG. 25 is a flowchart showing a procedure called and executed in step S101 of the flowchart shown in FIG. 14. This activation processing is the processing conducted by the mother board 40 and the gaming board 50. It should be noted that the memory card 53 is inserted into the card slot 53S in the gaming board 50, and the GAL 54 is mounted onto an IC socket 54S.

First, when a power switch is turned on (power is turned on) in the power supply unit 45, the mother board 40 and the gaming board 50 are activated (steps S1-1, S2-1). In activation of the mother board 40 and the gaming board 50, respective individual processing is executed in parallel. Namely, in the gaming board 50, the CPU 51 reads the auxiliary authentication program stored in the boot ROM 52, and conducts auxiliary authentication according to the read auxiliary authentication program, to previously check and prove that the authentication program is not falsified before loading the program to the mother board 40 (step S2-2). Meanwhile, in the mother board 40, the main CPU 41 executes the BIOS stored in the ROM 42, and expands compressed data which is incorporated in the BIOS into the RAM 43 (step S1-2). The main CPU 41 then executes the BIOS expanded into the RAM 43 to diagnose and initialize a variety of peripheral devices (step S1-3).

Since the ROM 55 of the gaming board 50 is connected to the main CPU 41 via the PCI bus, the main CPU 41 reads the authentication program stored in the ROM 55, and stores the read authentication program into the RAM 43 (steps S1-4). At this time, according to the standard BIOS function of BIOS, the main CPU 41 takes a checksum by ADDSUM system (normal checking system) and stores the authentication program into the RAM 43, while conducting processing for confirming whether or not the storage is certainly conducted.

Next, after confirming what is connected to the IDE bus, the main CPU 41 accesses, via the IDE bus, the memory card 53 inserted in the card slot 53S, to read a game program or a game system program from the memory card 53. In this case, the main CPU 41 reads data constituting the game program and the game system program by 4 bytes. Subsequently, the main CPU 41 conducts authentication to check and prove that the read game program and game system program have not been falsified, following the authentication program stored in the RAM 43 (step S1-5). When this authentication processing is normally completed, the main CPU 41 writes and stores the game program and the game system program, which have been the authentication targets (which have been authenticated), into the RAM 43 (step S1-6). Next, the main CPU 41 accesses, via the PCI bus, the GAL 54 mounted on the IC socket 54S, reads payout ratio setting data from the GAL 54, and writes and stores the data into the RAM 43 (step S1-7). Subsequently, the main CPU 41 conducts processing for reading country identification information stored in the ROM 55 of the gaming board 50 via the PCI bus, and writes and stores the read country identification information into the RAM 43 (step S1-8).

After conducting the above-mentioned processing, the main CPU 41 sequentially reads and executes the game program and the game system program, thereby execute the processing of step 101 shown in FIG. 14.

[To-be-Stopped Symbol Determination Processing]

Figure 26:
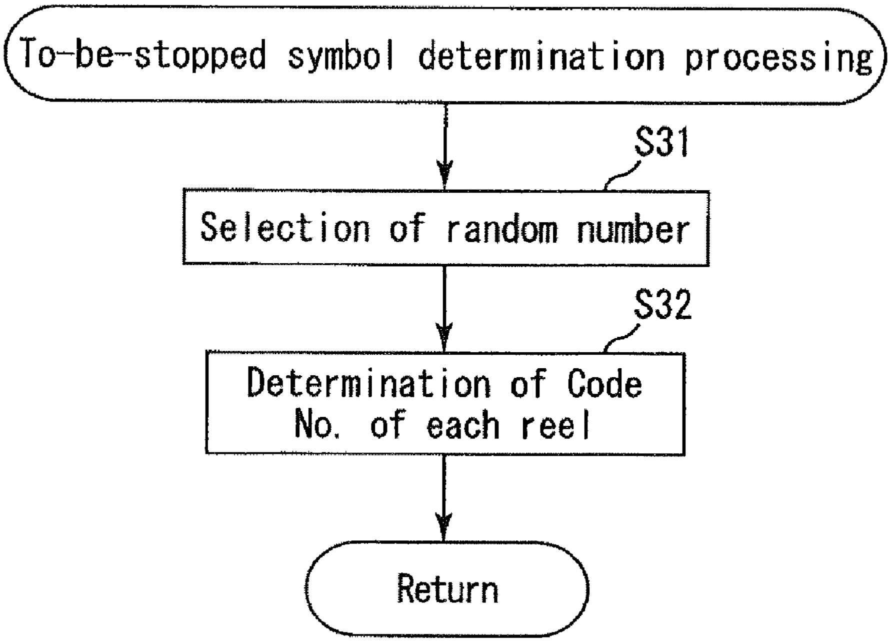
FIG. 26 is a flowchart showing a subroutine of to-be-stopped symbol determination processing.

FIG. 26 is a flowchart showing a subroutine of the to-be-stopped symbol determination processing called and executed in step S206 of the subroutine shown in FIG. 16. This is the processing conducted such that the main CPU 41 executes the to-be-stopped symbol determination program stored in the RAM 43.

First, the main CPU 41 executes a random number generation program included in the to-be-stopped symbol determination program, to select random numbers respectively corresponding to the three reels 14, out of the numbers falling in the numeric range of 0 to 255 (step S31). In the present embodiment, the case of generating random numbers on the program (the case of using a so-called software random number) is described. However, in the present invention, a random number generator may be provided and random numbers may be extracted from the random number generator (a so-called hardware random number may be used).

Next, the main CPU 41 (arithmetic processing unit) determines a code No. (see FIG. 25) of the respective reels 14 based on the selected three random numbers, by referring to symbol weighing data according to the payout ratio setting data outputted from GAL 54 and stored in the RAM 43 (storage device) (step S32). The code Nos. of the respective reels 14 correspond to code Nos. of symbols to be rearranged along the winning line L. It should be noted that later-described reel rotation control processing is conducted based on these code Nos. of the reels.

[Reel Rotation Control Processing]

Figure 27:
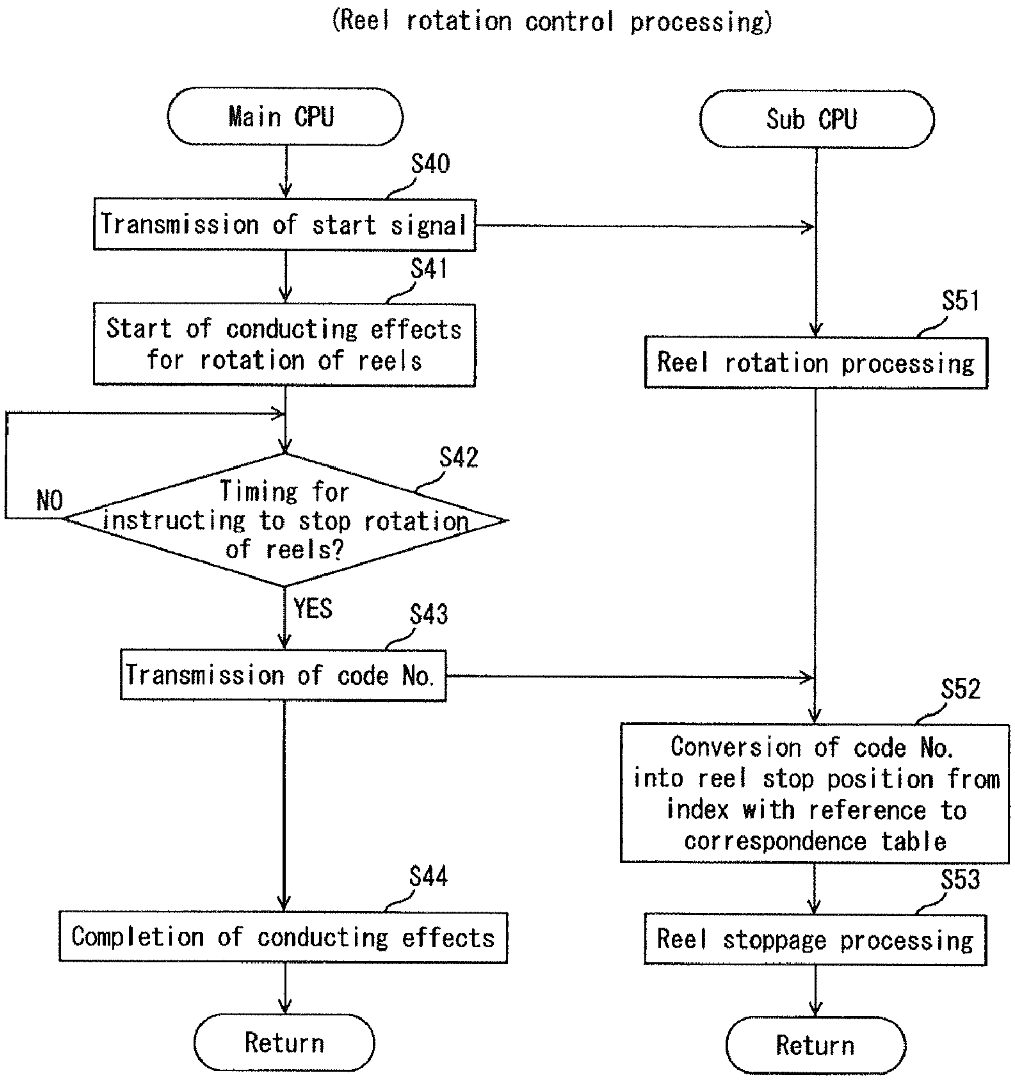
FIG. 27 is a flowchart showing a subroutine of reel rotation control processing.

FIG. 27 is a flowchart showing the reel rotation control processing called and executed in step S207 of the subroutine shown in FIG. 16. It is to be noted that this is the processing conducted between the main CPU 41 and the sub CPU 61.

First, the main CPU 41 transmits to the sub CPU 61*a* start signal to start rotation of the reels (step S40). Upon receipt of the start signal from the main CPU 41, the sub CPU 61 conducts the reel rotation processing (step S51). In this processing, the sub CPU 61 supplies a pulse to the motor driving circuit 62. The pulse outputted from the sub CPU 61 is amplified by the driver 64, and then supplied to each of the stepping motors 70 (70L, 70C, 70R). This results in rotation of each of the stepping motors 70, along with which each of the reels 14 (14L, 14C, 14R) is rotated. In the one-two phase excitation stepping motor 70, a step angle is 0.9 degrees and the number of steps per rotation is 400. Therefore, when 400 pulses are supplied to the stepping motor 70, the reel 14 rotates one turn.

In starting rotation of the reels 14, the sub CPU 61 supplies a low frequency pulse to the motor driving circuit 62, and gradually increases the pulse frequency. Along with this, a rotational speed of the reels 14 increases. After a lapse of a predetermined period of time, the pulse frequency is made constant. This results in rotation of the reel 14 at a constant speed.

Here, the rotational operation of the reel 14 is described by using FIGS. 28A to 28D.

FIGS. 28A to 28D are side views for explaining the rotational operation of the reel 14.

Figures 28A, 28B, 28C, 28D:
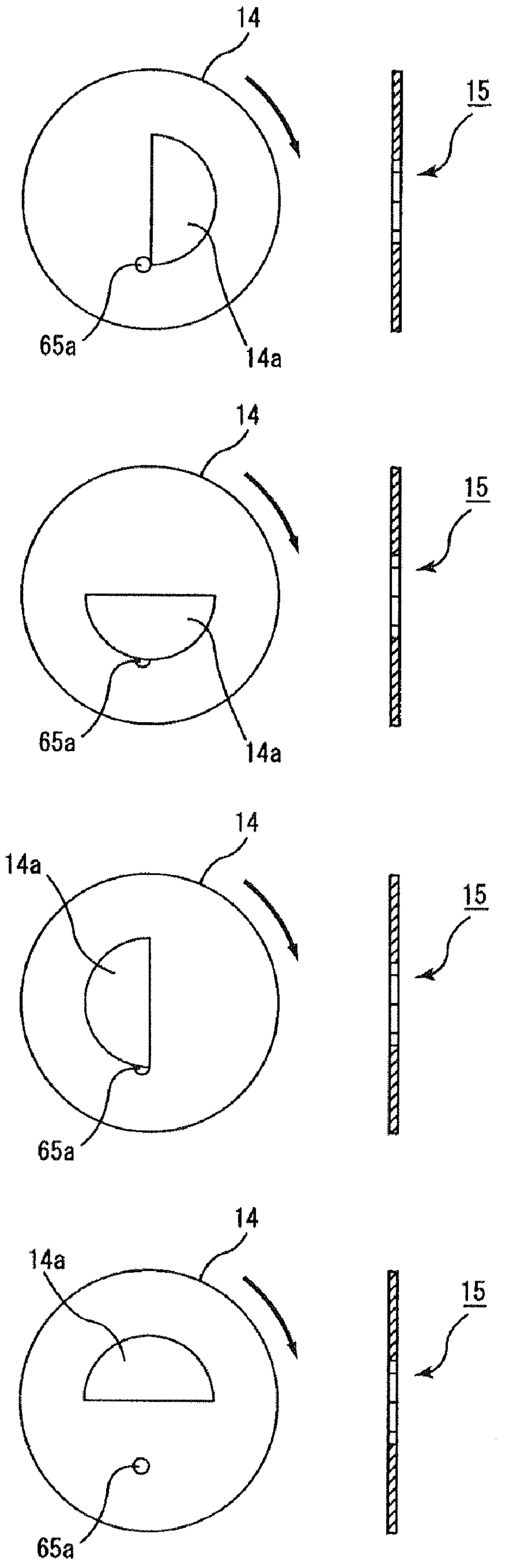
FIGS. 28A to 28D are side views for explaining the reel rotating operation.

As shown in FIG. 28A, a semicircular metal plate 14*a* is provided on the side face of the reel 14. The metal plate 14*a* is rotated along with the reel 14. Further, 22 symbols are provided on the peripheral face of the reel 14. Three symbols out of the 22 symbols drawn on the peripheral face of the reel 14 become visually identifiable via the display window 15 formed in front of the reel 14. In the figure, heavy-line arrows indicate the rotational direction of the reel 14. Further, an adjacent sensor 65*a* is provided on the side face of the reel 14. The adjacent sensor 65*a* is for detecting the metal plate 14*a*. The adjacent sensor 65*a* does not move or rotate along with rotation of the reel 14.

FIG. 24A shows a position (hereinafter also referred to as position A) of the metal plate 14*a* at the time point when the adjacent sensor 65*a* starts detecting the metal plate 14*a*. When the reel 14 rotates with the metal plate 14*a* located in the position A, the metal plate 14*a* moves to a position shown in FIG. 24B. FIG. 24B shows a position (herein after also referred to as position B) of the metal plate 14*a* when the adjacent sensor 65*a* is detecting the metal plate 14*a*. When the reel 14 rotates with the metal plate 14*a* located in the position B, the metal plate 14*a* moves to a position shown in FIG. 24C. FIG. 24C shows a position (hereinafter also referred to as position C) of the metal plate 14*a* at the time point when the adjacent sensor 65*a* stops detecting the metal plate 14*a*.

When the reel 14 rotates with the metal plate 14*a* located in the position C, the metal plate 14*a* moves to a position shown in FIG. 28D. FIG. 28D shows a position (herein after also referred to as position D) of the metal plate 14*a* when the adjacent sensor 65*a* is not detecting the metal plate 14*a*. When the reel 14 rotates with the metal plate 14*a* located in the position D, the metal plate 14*a* returns to the position A. As thus described, the position of the metal plate 14*a* changes sequentially from the position A, the position B, the position C, the position D, the position A, and so forth, along with rotation of the reel 14.

The adjacent sensor 65*a* constitutes the index detecting circuit 65 (see FIG. 2). Assuming that the state where the adjacent sensor 65*a* is detecting the metal plate 14*a* is referred to as "High" and the state where the adjacent sensor 65*a* is not detecting the metal plate 14*a* is referred to as "Low", the index detecting circuit 65 is in the "High" state when the metal plate 14*a* is located in the position A→the position B→the position C, and the index detecting circuit 65 is in the "Low" state when the metal plate 14*a* is located in the position C→the position D→the position A. It is to be noted that the sub CPU 61 identifies the rotational position of the reel 14 such that a leading edge from "Low" to "High" as index (original point) 1 and a falling edge from "High" to "Low" as index (original point) 2.

After transmitting a start signal to the sub CPU 61 in step S40, the main CPU 41 executes effects in rotation of the reels (step S41). This is the processing for displaying an image to the lower image display panel 16, outputting sound from the speaker 29, and the like, during a period (e.g. 3 seconds) set according to a result of the to-be-stopped symbol determination processing (FIG. 16, step S206) or the like.

Next, the main CPU 41 determines whether or not the current time point is the timing for instructing to stop rotation of the reels 14 (step S42).

Here, the timing for instructing to stop rotation of the reels 14 is the timing before the time point of stopping the performance of effects in rotation of the reels only by the minimum time required for stopping rotation of the reels 14. It is to be noted that the minimum time required for stopping rotation of the reels 14 is previously set.

In step S42, when determining that the current time point is not the timing for instructing to stop rotation of the reels 14, the main CPU 41 returns the processing to step S42, and continuously executes the performance of effects in rotation of the reels. On the other hand, when determining that the current time point is the timing for instructing to stop rotation of the reels 14 in step S42, the main CPU 41 transmits code No. stored in the RAM 43 to the sub CPU 61 (step S43). Upon receipt of code No. of the reels from the main CPU 41, the sub CPU 61 converts code No. into the stop position (the number of steps) of each reel from the index, based on the correspondence table of the number of steps stored in ROM (not shown) comprised in CPU 61 and code No. (step S52).

FIG. 29 is a schematic view showing a correspondence table of the number of steps and code No. Each code No. is corresponded to index and the number of steps.

It should be noted that each code No. corresponds to a symbol drawn on the peripheral face of the reel 14. Symbols of code No. "00" to "10" correspond to index 1. Symbols of code No. "11" to "21" correspond to index 2. Further, the numbers of steps in the correspondence table shown in FIG. 29 are the numbers of steps set with index 1 as a reference. For example, when code No. is "08", a position 145 steps from index 1 is the stop position of the reel. Further, when code No. is "12", a position 218 steps from index 1 is the stop position of the reel.

Next, the sub CPU 61 executes a reel stoppage processing (step S53). In this processing, the sub CPU 61 detects the leading edge (index 1) from "Low" to "High" of each reel 14 in the index detecting circuit 65, and supplies the index detecting circuit 65 with pulses corresponding to the number of steps into which code No. has been converted in step S52, at the timing of detecting index 1, and thereafter, the supply of the pulse is stopped.

For example, when it is determined that the stop position of the reel is a position 145 steps from index 1 in step S52, the sub CPU 61 supplies the index detecting circuit 65 with 145 pulses at the timing of detecting index 1, and then stops the supply of the pulse. Further, in step S52, when it is determined that the stop position of the reel is a position 218 steps from index 1, the sub CPU 61 supplies the index detecting circuit 65 with 218 pulses at the timing of detecting index 1. As a result, the reels 14 stop with the code numbers as determined in step S32 in FIG. 26, and a combination of symbols corresponding to the winning combination determined in step S32 in FIG. 26 is rearranged along the winning line L. Meanwhile, the main CPU 41 ends the performance of effects in rotation of the reels. After completing the processing of steps S44 and S53, the present processing is terminated.

It is to be noted that, when index corresponding to code No. transmitted in step S43 differs from index detected by the index detecting circuit 65 in stopping rotation of the reels 14, a loss of synchronism has occurred in the reels 14, and therefore, the main CPU 41 conducts processing for displaying an error message to the lower image display panel 16, or the like, to discontinue the game.

For example, when the index 1 is detected by the index detecting circuit 65 in stopping rotation of the reels 14 although the main CPU 41 conducts the processing for stopping reels 14 at code No. 12 which is corresponding to index 2, the game is discontinued.

As described above, when any of the condition that the remaining credit runs out, the condition that a smart card has been removed, the condition that a command for return of coins is inputted or the condition that the elapsed time T has become equal to or more than a certain time (the game ending condition) is satisfied, the slot machine 10 clears the number of counted games and also shifts to the non-insurance mode from the insurance mode (reset insurance).

Accordingly, even in the case where a player ends games without receiving a return, since insurance is reset, it is possible to prevent another player who has observed the games from receiving a return by only playing games at the slot machine 10 and consuming only a small amount of coins. This can prevent the player who has not received the return from having uncomfortable feeling and distrust against games, or from losing interest in games.

Further, in the case of the slot machine 10, insurance is reset upon receipt of a signal which is output by the operation of the cash-out button 25, and coins are paid out in number corresponding to the number of games at the time when the signal is received. Accordingly, by operating the cash-out button 25 at the end of games, even a player who has received no return (a player who has played games less than 1000 times) can receive paid-out coins (return) in number corresponding to the number of games at the time of the above-mentioned operation. Further, when the cash-out button 25 is operated, the insurance is reset. Therefore, a return is paid out according to the number of games to even a player who has played games less than 1000 times, and also it is possible to prevent another player who has newly started a game from receiving the return in a short period of time.

In the present embodiment, there has been described a case where, when a command for return of coins is inputted, a ticket on which the number of remaining credits is printed is issued and, also, the insurance is reset. However, the present invention is not limited to this example, but the insurance may be reset if a ticket output from the ticket printer is detected, even without the input of the command for return of coins. When no command for return of coins has been inputted, examples of the timing of outputting a ticket from the ticket printer include the timing when a combination of symbols for which payout of coins in number equal to or more than a predetermined number is set is established, the timing when a predetermined time (for example, the closing time of the facility) comes, and the like.

In the present embodiment, there has been described a case where the game ending condition according to the present invention is any of the condition that the remaining credits runs out, the condition that a smart card is removed, the condition that a command for return of coins is inputted, and the condition that the elapsed time T becomes equal to or more than a certain time. However, the game ending condition according to the present invention is not limited to the above-mentioned case, and examples of the game ending condition according to the present invention include a condition that an installed human detection sensor (for example, an infrared sensor) has detected no humans for a predetermined time period (for example, 3 minutes).

Also, the game ending condition may include a condition. where, for example, a fingerprint authentication device, a vein authentication device or a retina authentication device is installed, and no authentication is obtained in authentication procedures performed every predetermined time (for example, 5-min intervals).

Further, the game ending condition according to the present invention may be a condition that a predetermined combination of symbols is established in a predetermined order, for example, the combination of symbols "CHERRY-CHERRY-CHERRY" is established in the order from "CHERRY-ANY-ANY" to "CHERRY-CHERRY-ANY" to "CHERRY-CHERRY-CHERRY."

While, in the present embodiment, there has been described a case where the insurance is reset when the elapsed time T reaches a certain time, in the present invention, for example, a reserve button may be provided so that operation of the reserve button prevents the insurance from being reset even if the elapsed time T reaches the certain time. This structure enables a player to pause a game for having a break and the like and to re-start games with the number of games before pausing the game. Further, in the case of employing this structure, it is desirable that a password and the like should be inputted when pausing a game so as to prevent other players from starting the game.

In the present invention, it is also possible to provide a structure in which an additional BET can be bet in a period after the end of the BET acceptance time until all the reels are stopped, in addition to the above-mentioned BET acceptance time. In the case of providing such a structure which enables an additional BET, it is possible to reset the insurance when no additional BET is made in each game. It is preferable that the number of media to be paid out for the additional BETs be smaller than the number of game media paid out during the acceptance time. Games which enable additional BETs are not limited to games relating to symbol rearrangement, but may be, for example, roulette games and card games. In the case of employing games which enable additional BETs as roulette games, it is possible to bet an additional BET in a period after the end of the BET acceptance time until a winning number is determined. Further, in the case of employing games which enable additional BETs as card games, it is possible to allow additional BETs to be bet after the end of the Bet acceptance time period, until the end of these games (for example, until all players complete making hands, in the case of poker).

The slot machine 10 according to the present embodiment is a stand-alone type slot machine counting the number of games. However, in the present invention, the slot machine is not necessarily a stand-alone type slot machine, and a server connected to a plurality of slot machines via a network may count the number of games played in each slot machine.

Figure 30:
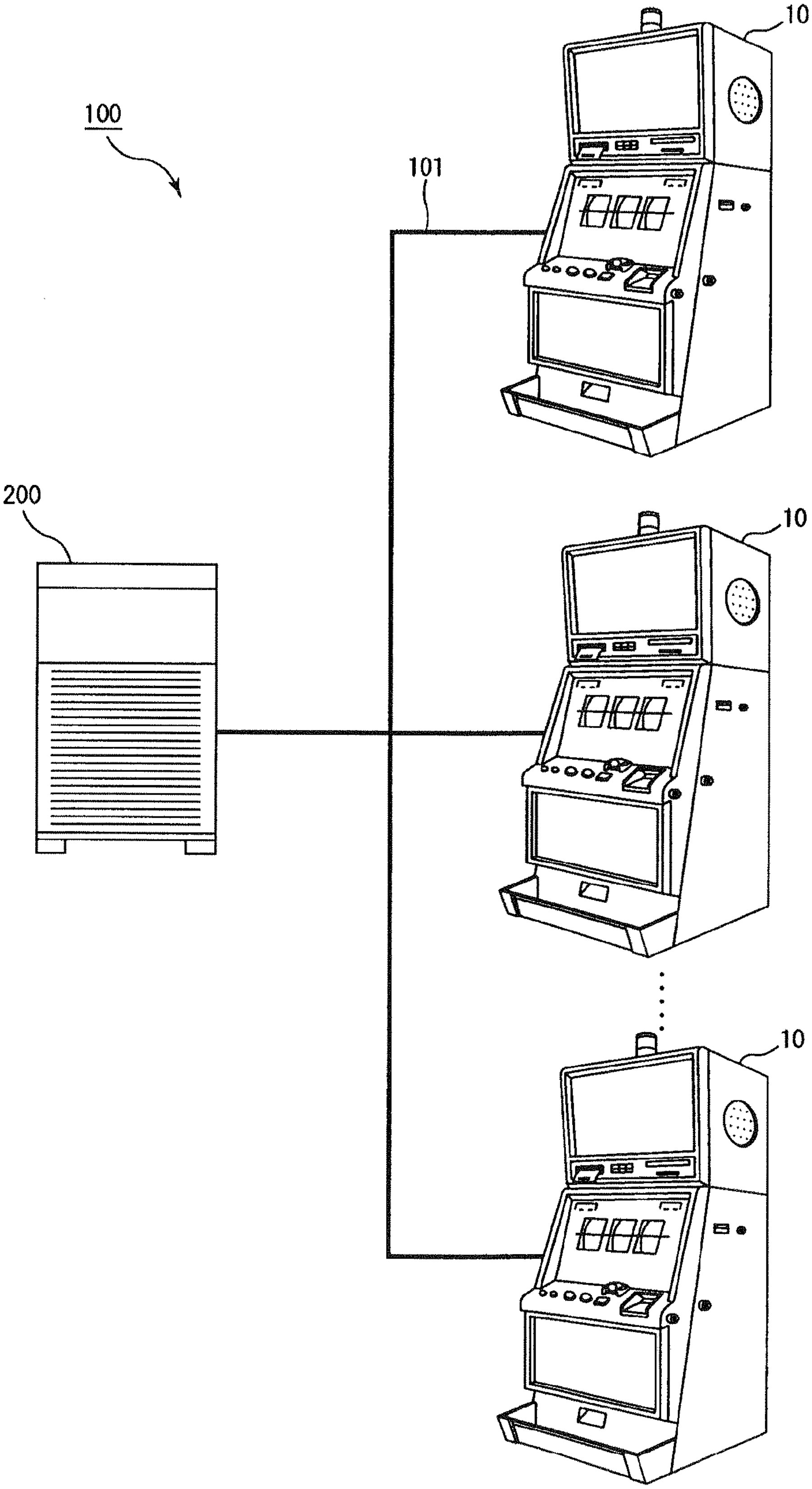
FIG. 30 is a schematic view showing an entire configuration of a game system according to one embodiment of the present invention.

FIG. 30 is a schematic view showing an entire configuration of a game system according to one embodiment of the present invention.

A game system 100 comprises a plurality of slot machines 10 and a server 200 connected with these slot machines 10 via a predetermined communication line 101. Such a game system 100 may be constructed inside one recreation facility where a variety of games can be played, such as a bar or a casino, or constructed among a plurality of recreation facilities. In the case of constructing the game system inside one recreation facility, the game system 100 may be constructed on each floor or in each section of the recreation facility. The communication line 101 is not particularly limited, and may be either wired or wireless, and an exclusive line, an exchange line or the like can be adopted.

The server 200 controls a plurality of slot machines 10. In the present embodiment, in particular, the server 200 conducts the processing for counting the number of games played in each slot machine 10. The server 200 may have a function as a so-called hall server which is installed in a recreation facility having a plurality of slot machines 10, a server to control a plurality of recreation facilities in block, or the like. It is to be noted that each slot machine 10 is provided with a unique identification number, and the server 200 determines from which slot machine data is transmitted according to the identification number. Also when data is transmitted from the server 200 to the slot machine 10, the server 200 specifies to which slot machine the data will be transmitted, by using the identification number.

In the above-mentioned example, the case of using mechanical reels 14 has been described. However, in the present invention, symbols may be displayed to a display device such as a liquid crystal display device in place of the mechanical reels.

Figure 31:
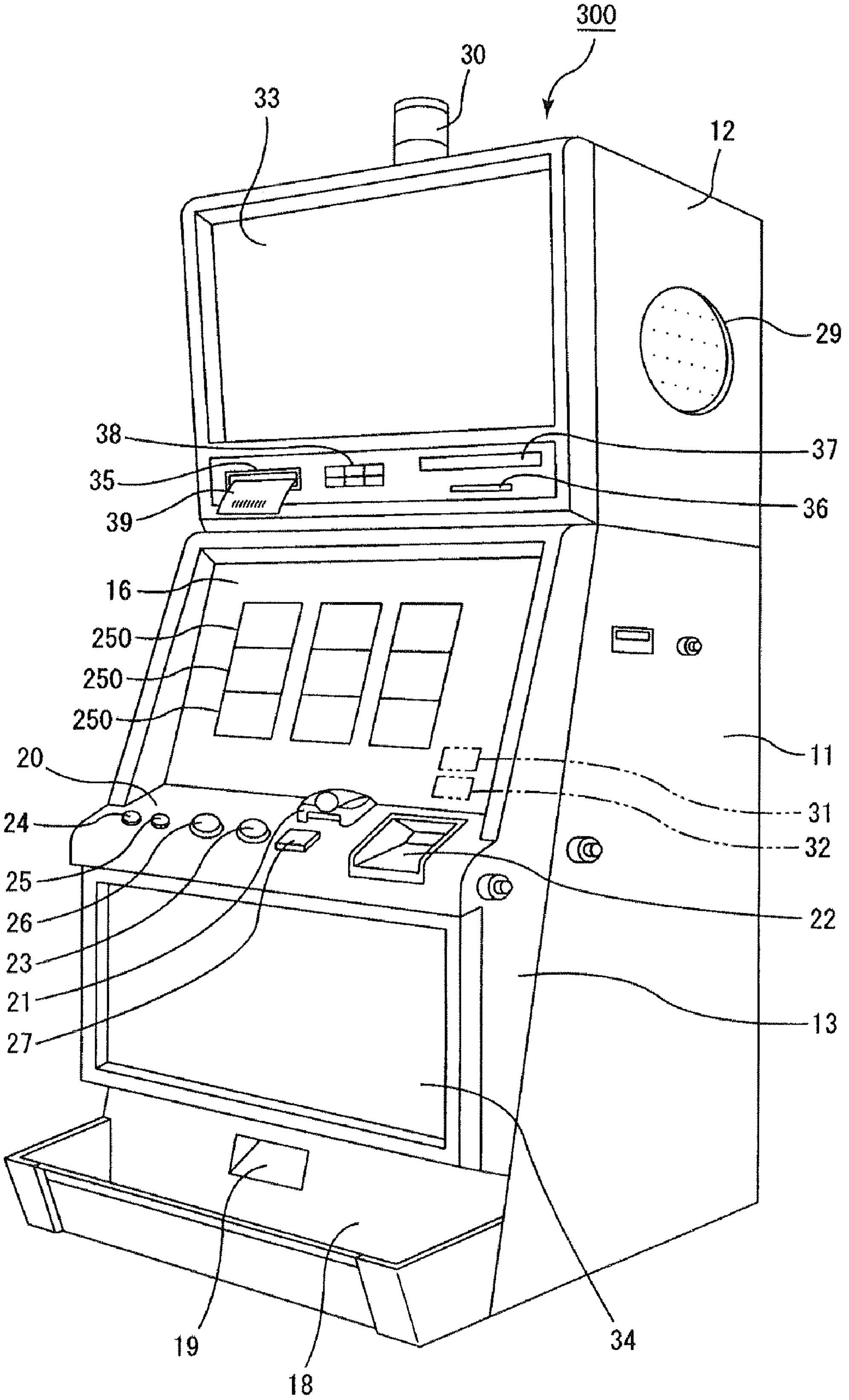
FIG. 31 is a diagrammatic view showing a slot machine according to another embodiment of the present invention.

FIG. 31 is a perspective view schematically showing a slot machine according to another embodiment of the present invention.

Except for displaying symbols to a lower image display panel, a slot machine 300 has substantially the same appearance, circuit configuration and the like as those of the slot machine 10, and the flowchart of the slot machine 300 is substantially the same as that of the slot machine 10. Therefore, descriptions of the slot machine 300 are omitted except for a description of symbol display. Further, constituents corresponding to those of the slot machine 10 are provided with the same numerals as in the slot machine 10.

The lower image display panel 16 included in the slot machine 300 is provided with symbol display areas 250 of three columns and three rows, and one symbol is displayed in each symbol display area. In such a configuration, the scroll-display of symbols may be displayed to the lower image display panel 16 in place of the reel rotation control by the sub CPU 61.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer or a computer network. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, another configuration requested for performing each step becomes apparent from the above descriptions.

What is claimed as new and desired to be secured by Letters Patent of the United States is:

1. A slot machine comprising:

a symbol display device that rearranges a plurality of symbols; and a controller, said controller programmed to conduct processing of (A) storing a number of values from game media possessed by a player as a plurality of credits;

(B) executing a game in which, after game media values in number equal to or less than a predetermined maximum number of BETs are bet by consuming at least a part of the plurality of credits, said plurality of symbols are rearranged by said symbol display device, and game media values in number according to the arranged symbols or combinations are paid out;

(C) shifting a mode from a non-insurance mode to an insurance mode when a predetermined condition is met;

(D) counting the number of games played after shifting to said insurance mode, in said insurance mode;

(E) paying out a predetermined number of game media values when the number of games counted in said processing (D) reaches a specific number; and (F) clearing the number of games counted in said processing (D) and at the same time shifting the mode from said insurance mode to said non-insurance mode without paying out the predetermined number of game media values, when said plurality of credits run out, said plurality of credits being increased as the player inserts at least one of the game media values in number.

2. The slot machine according to claim 1, wherein said controller is further programmed to conduct processing of (G) determining whether or not a player has been changed, and said processing (F) includes clearing the number of games counted in said processing (D) and at the same time shifting the mode from said insurance mode to said non-insurance mode without paying out the predetermined number of game media values, when it is determined that the player has been changed.

3. The slot machine according to claim 2, further comprising a reader for reading identification data for identifying the player from a card carried by the player, wherein said processing (G) is processing for executing processing of:

(G-1) reading the identification data from said card through said reader, (G-2) storing the identification data read from said card, and (G-3) determining that the player has been changed, when data different from the identification data stored in said processing (G-2) has been read.

4. The slot machine according to claim 2, further comprising a card slot which allows a card, carried by the player, to be inserted into or removed from said card slot, wherein said processing (F) includes clearing the number of games counted in said processing (D) and at the same time shifting the mode from said insurance mode to said non-insurance mode without paying out the predetermined number of game media values, when it is determined that said card has been inserted into and thereafter removed from said card slot.

5. The slot machine according to claim 1, further comprising a collect button for inputting a command for returning game media, wherein said processing (F) includes clearing the number of games counted in said processing (D) and at the same time shifting the mode from said insurance mode to said non-insurance mode without paying out the predetermined number of game media values, when a signal indicative of a command for returning game media is received from said collect button.

6. The slot machine according to claim 1, further comprising a ticket printer for outputting a ticket, wherein said processing (F) includes clearing the number of games counted in said processing (D) and at the same time shifting the mode from said insurance mode to said non-insurance mode without paying out the predetermined number of game media values, when it is detected that said ticket printer outputs a ticket on which information about the number of game media values stored as credit is recorded.

7. The slot machine according to claim 1, wherein said controller is further programmed to conduct processing of (H) measuring the time elapsed since the last time a game was executed, and said processing (F) includes clearing the number of games counted in said processing (D) and at the same time shifting the mode from said insurance mode to said non-insurance mode without paying out the predetermined number of game media values, when the elapsed time measured in said processing (H) reaches a certain time.

8. The slot machine according to claim 7, further comprising a BET button which enables the player to input a BET, wherein said processing (H) includes measuring the time elapsed since the last time an input from the BET button was detected.

9. The slot machine according to claim 1, further comprising an input button for inputting a command for shifting the mode from said insurance mode to said non-insurance mode, wherein said controller is further programmed to conduct processing of (I) clearing the number of games counted in said processing (D) and at the same time shifting the mode from said insurance mode to said non-insurance mode, when a signal indicating the shift to the non-insurance mode, which is output by the operation of said input button is received, and (J) paying out a calculated number of game media values according to the number of games at the time of receiving a signal indicating the shift to the non-insurance mode, which is output by the operation of said input button.

10. The slot machine according to claim 1, wherein the controller outputs a sound for notifying the player that the insurance mode is going to be reset in a short time when a number of the credits is greater than 0 and is less than or equal to a threshold.

11. The slot machine according to claim 1, wherein the controller outputs a sound for indicating that the insurance mode has been reset.

12. A game control method implemented by a slot machine, comprising the steps executed by the slot machine of:

(A) storing a number of values from game media possessed by a player as a plurality of credits;

(B) executing a game in which, after game media values in number equal to or less than a predetermined maximum number of BETs are bet by consuming at least a part of the plurality of credits, said plurality of symbols are rearranged by said symbol display device that rearranges the plurality of symbols, and game media values in number according to the arranged symbols or combinations are paid out;

(C) shifting a mode from a non-insurance mode to an insurance mode when a predetermined condition is met;

(D) counting the number of games played after shifting to said insurance mode, in said insurance mode;

(E) paying out a predetermined number of game media values when the number of games counted in said step (D) reaches a specific number; and (F) clearing the number of games counted in said step (D) and at the same time shifting the mode from said insurance mode to said non-insurance mode without paying out the predetermined number of game media values, when said plurality of credits run out, said plurality of credits being increased as the player inserts at least one of the game media values in number.

13. The method according to claim 12, further comprising outputting a sound for notifying the player that the insurance mode is going to be reset in a short time when a number of the credits is greater than 0 and is less than or equal to a threshold.

14. The method according to claim 12, further comprising outputting a sound for indicating that the insurance mode has been reset.

* * * * *